United States Patent
Digate et al.

(10) Patent No.: US 7,149,288 B2
(45) Date of Patent: Dec. 12, 2006

(54) RULES BASED REAL-TIME COMMUNICATION SYSTEM

(75) Inventors: Charles J. Digate, Winchester, MA (US); Christopher F. Herot, Newton Highlands, MA (US); Tonytip Ketudat, Lexington, MA (US); Alexis M. Kopikis, Brighton, MA (US)

(73) Assignee: Convoq, Inc., Lexington, MA (US)

( * ) Notice: Subject to any disclaimer, the term of this patent is extended or adjusted under 35 U.S.C. 154(b) by 320 days.

(21) Appl. No.: 10/731,872

(22) Filed: Dec. 9, 2003

(65) Prior Publication Data

US 2004/0161090 A1    Aug. 19, 2004

Related U.S. Application Data

(63) Continuation-in-part of application No. 10/367,617, filed on Feb. 14, 2003.

(51) Int. Cl.
*H04M 1/64* (2006.01)

(52) U.S. Cl. ............... 379/88.17; 379/201.1; 370/252; 709/205

(58) Field of Classification Search ............ 379/265, 379/207, 220
See application file for complete search history.

(56) References Cited

U.S. PATENT DOCUMENTS

| | | | | |
|---|---|---|---|---|
| 5,283,856 A | | 2/1994 | Gross et al. ............ 395/51 |
| 5,506,893 A | * | 4/1996 | Buscher et al. ......... 379/115.02 |
| 5,689,566 A | * | 11/1997 | Nguyen .................. 713/155 |
| 5,946,387 A | * | 8/1999 | Miloslavsky ........... 379/265.12 |
| 6,449,344 B1 | | 9/2002 | Goldfinger et al. ...... 379/88.17 |
| 6,760,322 B1 | * | 7/2004 | Fukuda et al. ............ 370/352 |
| 6,804,334 B1 | * | 10/2004 | Beasley et al. .......... 379/88.17 |
| 6,914,900 B1 | * | 7/2005 | Komatsu et al. ........... 370/356 |
| 6,917,676 B1 | * | 7/2005 | Yoshida et al. ........ 379/207.02 |
| 2002/0194272 A1 | * | 12/2002 | Zhu ........................ 709/204 |
| 2003/0224816 A1 | * | 12/2003 | Kundaje et al. ............ 455/518 |

\* cited by examiner

*Primary Examiner*—Gerald Gauthier
(74) *Attorney, Agent, or Firm*—Weingarten, Schurgin, Gagnebin & Lebovici LLP

(57) ABSTRACT

A rules-based real-time messaging system for groups of users, in which an availability status is maintained in association with each user. Clients are communicably coupled to a real-time messaging server, which maintains indications of the online/offline presence of each user, as well as other user attributes. Rules and a rules engine are maintained in the real-time messaging server for controlling the delivery of messages to the users, and for controlling how the availability of users is provided to other users. Based on the specific rules stored on the real-time messaging server, the rules engine determines the state of various relevant conditions such as the availability of users of the system, and detects the occurrence of various real-time events such as a user logging-on to or logging-off from the system for controlling the delivery of various types of messages and/or the performance of resulting actions.

23 Claims, 19 Drawing Sheets

| When (Events) 172 | If (Conditions) 174 | Then (Actions) 176 |
|---|---|---|
| Presence Changes<br>  User goes Online/Offline<br>  Explicit:<br>    Direct Manipulation<br>    User Defined<br>  Implicit:<br>    In a meeting<br>    on the telephone<br>    In-meeting events (e.g. presenting)<br><br>Time Passes<br>  Specific<br>  Recurring<br>  Elapsed Time<br>  Inaction<br><br>Invitation received<br>  To meet<br>  To join group/team<br><br>System Condition occurs<br><br>Trigger from 3rd party application | Presence<br>  Auto-detected<br>  User Defined<br>Device Availability<br>  Camera<br>  Video<br>  PC<br>  Phone<br>  SMS<br>  PDA<br>Bandwidth Capacity<br>Contact preference<br>Identify<br>  PID<br>  Lifeline<br>  -membership<br>  location<br>Group Membership<br>  General<br>  selection by role/rule | Notify (IM, E-mail, SMS)<br><br>Meet<br><br>Schedule<br><br>Call<br><br>Route<br><br>Broadcast<br><br>Contact Delegate<br><br>Leave Message<br><br>Transfer Thread<br><br>Retract |

*FIG. 9*

RULES BASED REAL-TIME COMMUNICATION SYSTEM

CROSS REFERENCE TO RELATED APPLICATIONS

This application is a continuation-in-part of U.S. patent application Ser. No. 10/367,617 filed Feb. 14, 2003 entitled RULES BASED REAL-TIME COMMUNICATION SYSTEM.

STATEMENT REGARDING FEDERALLY SPONSORED RESEARCH OR DEVELOPMENT

N/A

BACKGROUND OF THE INVENTION

The present invention relates to real-time communication, and, more specifically, to a rules-based real-time communication system that facilitates conference scheduling, information distribution and communication among a plurality of users.

Various messaging communication systems have been developed and deployed over the years as computer systems have proliferated and the desire to be able to communicate efficiently for business and personal reasons has become more widespread. Most computer users employ electronic mail ("e-mail") to send and receive messages via a computer network. A number of e-mail systems have been widely used over the last decade.

Electronic mail ("e-mail") systems allow messages generated by one individual to be transmitted to one or more individuals, each identified by an associated e-mail address. E-mail systems are not real-time communication systems in that a sender of an e-mail message has no awareness of whether an intended recipient is currently online. Thus, the sender of the message does not know when the message is likely to be viewed. Consequently, an individual may transmit an e-mail message to an intended recipient and the intended recipient may not respond for hours or days if the recipient is unavailable. Thus, even in the case where an e-mail message sender seeks to obtain needed information from the recipient(s) of an e-mail message, the sender nonetheless cannot ascertain when a response will be obtained.

Moreover, the intended recipients of an e-mail are statically defined. An e-mail is directed to a particular recipient having a unique associated e-mail address, or to a predefined group of individuals, irrespective of the current, online availability of the respective recipients to respond.

As e-mail systems have become increasingly prevalent, rule-based techniques have been employed to allow for control over filing, routing and deletion of e-mails. Such existing rule-based systems have been designed to benefit users who receive large numbers of e-mails. One such rule-based e-mail system is disclosed in U.S. Pat. No. 5,283,856 of Gross et al.

More recently, real-time messaging systems such as disclosed in U.S. Pat. No. 6,449,344 to Goldfinger et al. have become common. In such existing systems, a server maintains a list of users that are currently online, for the purpose of enabling real-time communication sessions between such "logged on" users. In systems such as the described by Goldfinger et al., each user maintains a list of other users whose online status is of interest. The server then provides indications regarding the online status of those users of interest. Users are notified when other users identified in their respective list are online and when such individuals go offline.

While real-time messaging systems such as the well-known AOL Instant Messenger (AIMT™) of America Online, and Microsoft Messenger (MSM™) of Microsoft Corporation are widely used for personal point to point communication, they have not become generally accepted as business tools due to several shortcomings.

Specifically, in a business environment, solutions to problems often require input from multiple individuals, each of which may be knowledgeable and/or responsible in a different area. When trying to solve such multi-dimensional problems, it is often desirable to convene a real-time conference bringing together a group of persons each having such different skills or knowledge. This cannot reliably be accomplished through an e-mail system, since conventional e-mail systems do not maintain information regarding the current online status of users. Additionally, in the above-described existing real-time messaging systems, if an individual needed for a conference is not currently available, there is little that can be done via the messaging system to move ahead with the planned agenda.

For the above reasons, it would be desirable to have a real-time messaging system designed to facilitate real-time convening of conferences and other forms of business communication. Such a system should advantageously employ presence indicators to efficiently convene conferences when possible, to convene such conferences as soon as possible if it is not feasible to schedule a conference immediately, and/or to schedule a conference at a predetermined time in the future to support participation in the conference by key individuals or their stand-ins.

BRIEF SUMMARY OF THE INVENTION

A rules based real-time messaging system for groups of users is disclosed, in which an availability status may be maintained in association with each user. A number of client systems are communicably coupled to a real-time messaging server via a network. The real-time messaging server applies a set of rules to the availability status of users, as well as other attributes associated with users, in order to facilitate effective real-time message passing between users. As described herein, the availability status of a user reflects what is generally referred to as the online presence of that user.

The real-time messaging server includes a number of rules and a rules engine for controlling delivery of messages to users, and for controlling how user availability is communicated among users. Rules stored in the rules database, or the rules engine itself, include various types of rules, including "when" and "if-then" type rules. Based on the rules stored on the real-time messaging server, the rules engine determines the state of relevant conditions, such as the availability status of specific users, and responds to the occurrence of relevant real-time events, such as a user logging-on or logging-off, in order to control the delivery of various messages and/or performance of resulting actions.

The disclosed system facilitates real-time group interaction by monitoring events and testing for conditions, and taking appropriate actions. Through the rules and rules engine in the real-time messaging server, the disclosed system enables users to control their availability to other users, and how they are accessed for real-time activities such as online meetings or teleconferences. As a result, the disclosed real-time messaging system is particularly suited for setting up real-time activities among key individuals. The disclosed system advantageously employs online presence indicators to conveniently convene a conference immediately when possible, to convene a conference as soon as possible if it is not feasible to convene the conference immediately, and/or to schedule a conference at a predetermined time in the future, as well as assuring the participation of needed contributors in a conference or other real-time activity. Moreover, while the disclosed system is described herein with reference to various embodiments and examples of operation in which convening a meeting is used as an example of a real-time activity or action, the real-time activities or actions provided by or in connection with the disclosed system are not limited to meetings between users, and may additionally or alternatively include chat sessions, shared whiteboards, remote presentations, audio conferences, video conferences, and/or any combination of these or other forms of communication between users.

Other features, aspects and advantages of the presently disclosed system and method will be apparent from the detailed description of the invention that follows.

BRIEF DESCRIPTION OF THE SEVERAL VIEWS OF THE DRAWING

The invention will be more fully understood by reference to the following detailed description of the invention in conjunction with the drawings, of which:

FIG. 9 is a table showing relationships between events, conditions and actions, as used in rules in an illustrative embodiment;

DETAILED DESCRIPTION OF THE INVENTION

Figure 1:
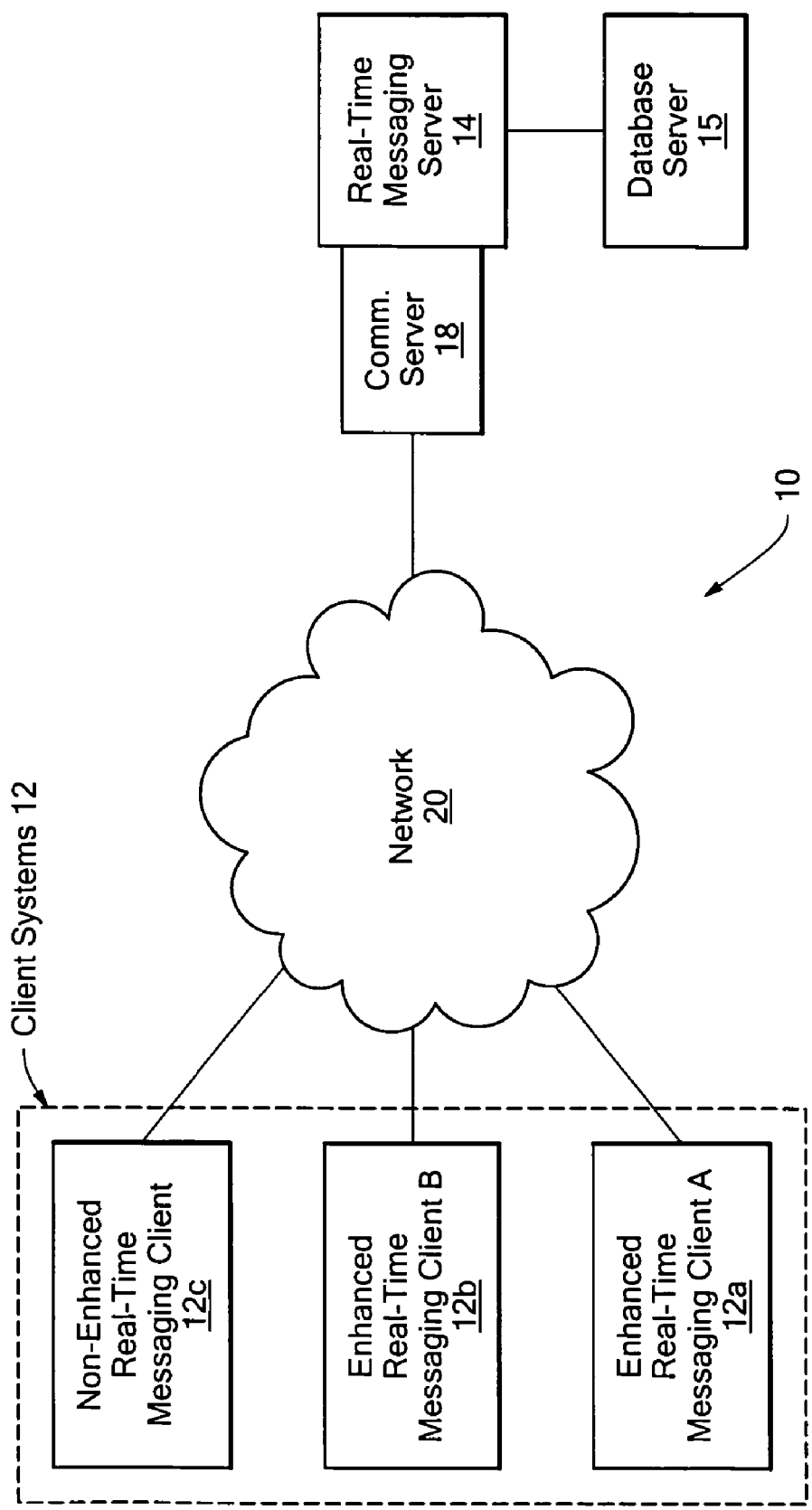
FIG. 1 is a block diagram illustrating an embodiment of the disclosed system in which a number of real-time messaging client systems are interconnected with a real-time messaging server via a network.

As shown in FIG. 1, an embodiment of the disclosed system includes a number of real-time messaging client systems 12, shown for purposes of illustration as enhanced real-time messaging clients 12a and 12b, as well as non-enhanced real-time messaging client 12c. The real-time messaging client systems 12 are communicably coupled with a network 20, to which a communication server 18 is also communicably coupled. The communication server 18 may, for example, be embodied as a Macromedia® Flash™ Communication Server MX. A real-time messaging server 14 is shown communicably coupled to the communication server 18, and a database server 15 is further shown communicably coupled to the real-time messaging server 14.

Each of the server systems 14, 15 and 18, as well as the client systems 12a, 12b and 12c, may be embodied as separate computer systems, each including one or more processors, together with program code memory and one or more secondary program code storage devices, a number of input/output interface devices, and operating system and application program software, as configured for a given operational environment. The communication server 18 includes Web server software including an HTTP (HyperText Transport Protocol) server that manages Web page requests received over the network 20, and that delivers HTML (HyperText Mark-up Language) documents (Web pages) in response. A separate server system including Web server software, coupled to the communication server 18, may alternatively be used for this purpose. The enhanced client systems A 12a and B 12b include client software operable to perform functions associated with the disclosed system in cooperation with the real-time messaging server 14. The non-enhanced client system 12c does not include specialized client software associated with the real-time messaging server 14. Instead, messages and content used to take advantage of features of the disclosed system may be loaded and processed as needed by other software on the non-enhanced client system 12c. The embodiment of the disclosed system shown in FIG. 1 operates to provide real-time messaging and other functions to users of client systems having client software associated with the real-time messaging server 14 loaded on them, as well as to users of client systems that do not have such client software loaded on them but do have some mechanism allowing software to be loaded on demand, such as Flash or Java.

While in the illustrative embodiment of FIG. 1, the real-time messaging server 14, communication server 18 and database server 15 are shown as separate computer systems, the present invention is not limited to such an embodiment. In alternative embodiments, the communication server 18, real-time messaging server 14 and database server 15 may be embodied within some greater or lesser number of separate computer systems, as needed for a given operational environment.

The communication server 18 in the embodiment of FIG. 1 is shown only for purposes of explanation, and the present invention is not limited to implementations or embodiments including it. The present system may be embodied using any specific type of previously installed client side application software, such as Flash™, that is capable of providing text, video, and/or other content in an interactive graphics format through Web pages downloaded to a Web browser program executing on a client system. The embodiment of FIG. 1 illustrates that the disclosed system may be implemented in a way that takes advantage of such previously loaded client system interface software. The use of previously installed client side software, such as the Flash™ client side software, enables the disclosed system to operate without requiring the loading of special client side software, leveraging the common availability of software such as Flash™ software on most client computer systems. Thus, the communication server 18 generally defines a protocol to interface to non-enhanced client systems. An example of such a protocol is RTMP ("Real Time Messaging Protocol"). In the alternative, the disclosed system may be embodied using only enhanced real-time messaging client systems, such as client A 12a and client B 12b, which have been loaded with specialized client software. In any case, the real-time messaging server 14 may directly communicate with such enhanced client systems, without using an intermediate server such as the communications server 18.

During operation of the disclosed system, as shown in the embodiment of FIG. 1, real-time messaging is provided between users of the client systems 12, based on rules and a rules engine in the real-time messaging server 14, and in response to a number of monitored conditions, such as the availability status of users, as well as the detection of predetermined events. The real-time messaging provided by the disclosed system advantageously facilitates rapid initiation of real time group actions, such as meeting convocation, by contacting a group of users required for a meeting based on dynamically determined group membership, at least in part as a function of which users are presently available to participate.

The disclosed system allows stand-ins to be substituted for group members that are unavailable. Stand-ins may be automatically selected for group members based on matches between their roles, expertise and/or preferences with respect to the requirements of a specific meeting, as well as on stand-in designations made by individual users, as represented by data stored on the real-time messaging server. For example, the disclosed system may provide selective delegation as a function of the subject matter of a given meeting. Additionally, the disclosed system provides transitivity of delegation to stand-ins between users or groups, resulting in an increased ability to quickly get a given inquiry to an appropriate user. In the preferred embodiment, the disclosed system allows a user to make express invitations to stand-ins or express selections of stand-ins to join a meeting. Such invitations and/or selections may be made via a dialog box within the graphical user interface. Specifically, the dialog box may list individuals included in a particular meeting invitation, and may allow the user (1) to select stand-ins automatically for the individuals in the list who are currently unavailable, (2) to invite all of the listed individuals to the meeting whether or not they are currently available, or (3) to invite only those individuals in the list who are currently available.

For example, an individual who is invited or selected to attend an online meeting may be unavailable because he or she is currently participating in another online meeting. At any point in time, a user of the disclosed system may have several outstanding meeting requests. In the preferred embodiment, an "alerts" window is provided within the graphical user interface to indicate (1) which meetings are in-progress, (2) which meetings are pending based on the availability of the participants, (3) and which meetings are now ready to begin. By viewing the alerts window (also called an IMbox), users of the disclosed system can track the progress of multiple online meetings. The alerts window may also serve as a general-purpose notification window for messages generated by the system or by the system users.

The disclosed system provides a number of features relating to the use of groups. First, the disclosed system permits group definitions to be shared among users. Also, temporary membership in a group may be enabled, for example to grant temporary access to data and/or specific functions associated with the group. Further, with regard to determining an appropriate stand-in, the disclosed system may operate to provide data mining for relevant skills assessment, e.g. by identifying one or more user(s) who recently published something on a given topic, or that responded to a message on the topic.

Figure 2:
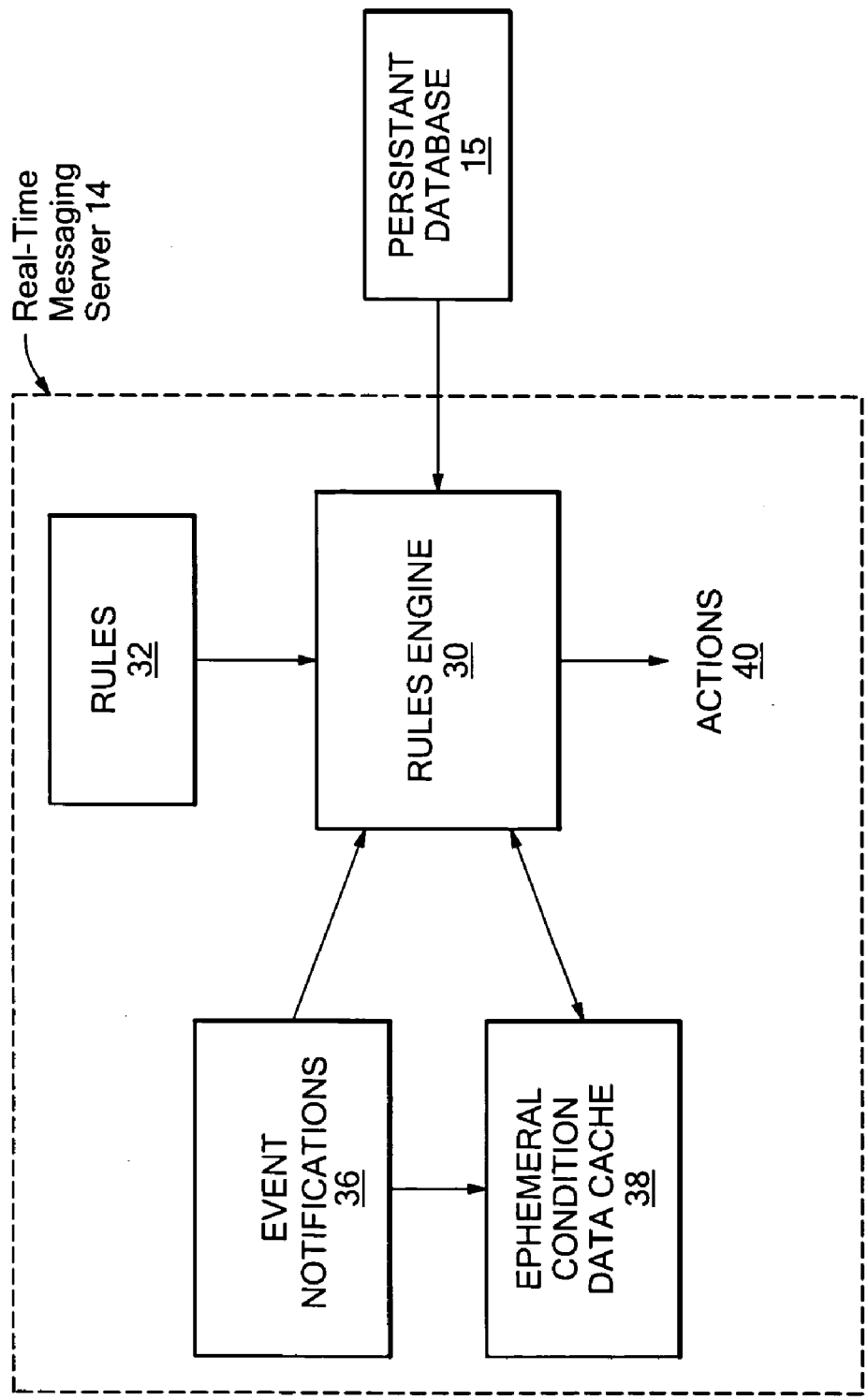
FIG. 2 is a block diagram illustrating an embodiment of the disclosed real-time messaging server.

FIG. 2 shows an example of software components within the real-time messaging server 14 of FIG. 1. As shown in FIG. 2, the software components within the real-time messaging server 14 include a rules engine 30 for processing a number of rules 32. The rules engine 30 is responsive to event notifications 36 and the contents of the ephemeral condition data cache 38. The rules engine 30 is further responsive to the contents of a persistent database 15, which may, for example, be stored on a separate database server system, such as the database server system. Alternatively, the rules 32 may not be separate from the rules engine itself, but be provided within the rules engine itself.

The ephemeral condition data cache 38 includes presence indications for users. Such presence indications reflect the instantaneous availability of system users. Such instantaneous availability information may, for example, be obtained through a subscription model, in which the software on the real-time messaging server subscribes to notifications from specific client systems indicating events relating to the online status of certain users. Such notifications might include event messages indicating when a user logs on or off a client system. Accordingly, the ephemeral condition data cache 38 is used to store information describing previous events. Additionally, users that are registered with the disclosed system, referred to as "subscribing users", may store information, for example in the persistent database 15, that control how their presence information is provided as availability status to other users. For example, an availability filter may be configured by a user such that the online presence of that user is made known to all users, to some other users, or to no other users. Such availability filtering may be based on the definition of a VIP ("Very Important Person") list for a user. The user entries in a VIP list store information defining how the availability of that user is made available or visible to other users. Such selective availability may be defined on a user-by-user basis, and/or on a group or global basis, and may further be defined to reflect current conditions or other factors, such as time of day, specific dates, or functional associations. Accordingly, a user may configure his or her VIP list to allow a group of other users to be aware of his or her availability only at certain times of day, and/or on certain days. Additionally, a user may specify how availability is filtered based on activities, topics, or functions. For example, a user may configure his or her account such that a group of other users can only see that user as available only for meetings regarding certain predefined topics.

The persistent database 15 includes configuration data maintained by the disclosed system reflecting user preferences and group definitions. In an embodiment in which users that are "subscribers" may define account information, the database 15 maintains account data for such subscriber users. Subscriber data may include, for example, stand-in definitions, availability filters, and/or contact lists of other subscriber users as well as non-subscriber users. The rules 32 define the actions 40 that are performed in response to the event notifications 36, ephemeral condition data cache 38, and data stored in the persistent database. The rules 32 are processed by the rules engine 30, which may be embodied in any appropriate programming language for a given implementation.

The actions 40 performed by the rules engine 30 may, for example, include actions facilitating any specific kind of real time group activity. Such real time group activities may include the convening of an online meeting or teleconference, sending email or an instant message to one or more users, routing a document, and/or other actions. The actions 40 may be simple or complex, and potentially include multi-stage actions that are performed in several distinct steps, depending on the receipt of several separate event notifications and the state of conditions stored in the ephemeral condition data cache over time.

Figure 3:
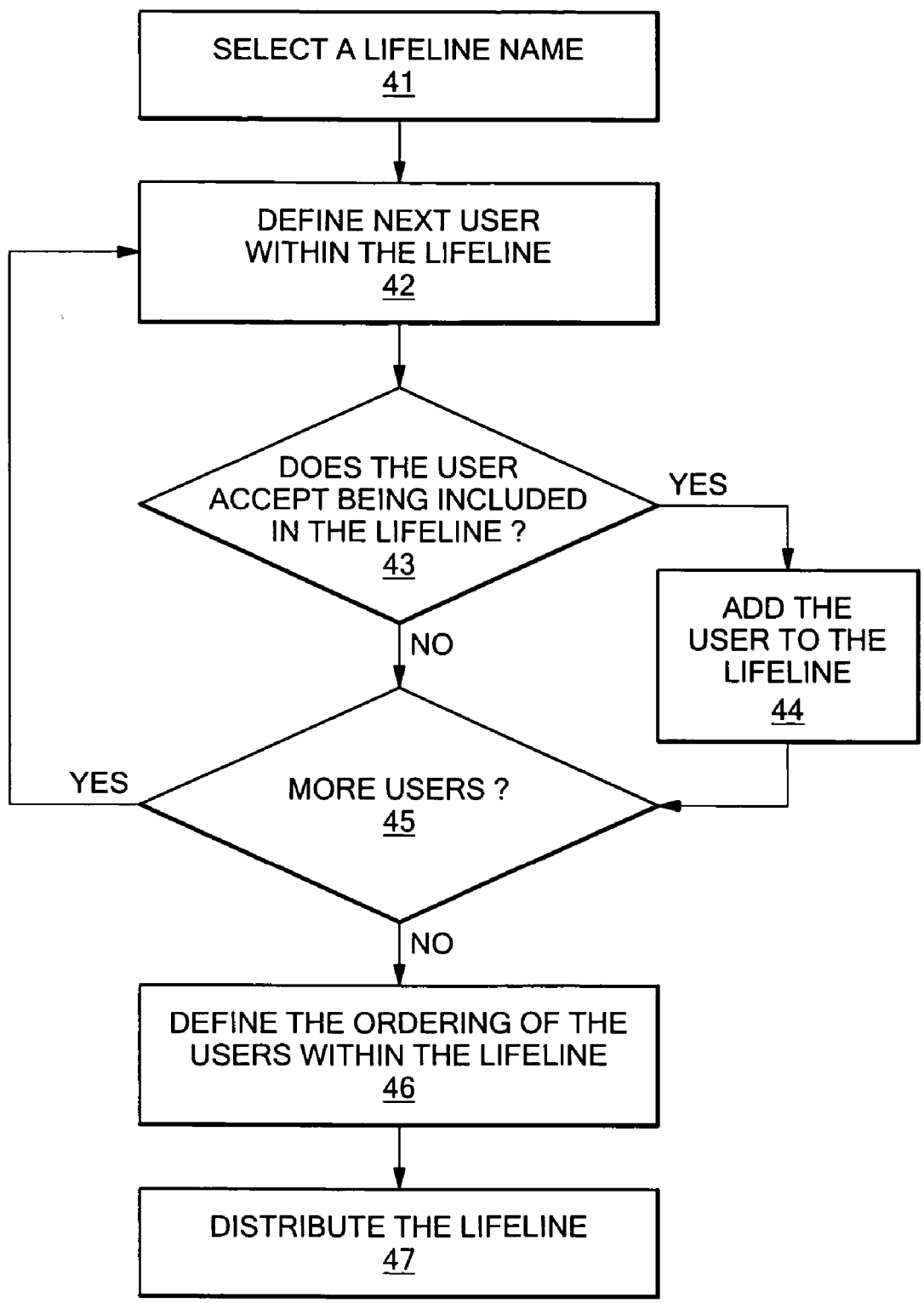
FIG. 3 is a flow chart showing steps performed to create a lifeline in an illustrative embodiment.

FIG. 3 is a flow chart illustrating the steps performed by the user of the disclosed system to configure a "lifeline." A lifeline in the disclosed system is a list of users that is associated with a name, and one or more ordering attributes. At step 41, the user selects the name of the lifeline being created. For example, a lifeline consisting of a list of users in technical sales support group for a given product might be referred to as the "product_A_tech" lifeline. At step 42, one or more possible users within the lifeline are defined. For example, possible users may be successively defined by entry or selection through a graphical user interface. At step 43, a determination is made as to whether the user defined in step 42 accepts being included in the lifeline. In the preferred embodiment, the user is given an opportunity in a real-time to make an express acceptance or rejection of the invitation to join the lifeline before being added to the lifeline. For example, a dialog box may be displayed within the graphical user interface indicating to the user that he or she is being invited to be a resource in the lifeline. Further, respective buttons may be provided within the dialog box to allow the user to either accept or reject the invitation, thereby allowing permission for the lifeline resource to be obtained in real-time. In the event the user accepts the invitation, the user is added to the lifeline, as indicated at step 44. In the event the user rejects the invitation, the user is not added to the lifeline. At step 45, another determination is made as to whether there are more users to define within the lifeline. If there are more users to define within the lifeline, then the process flow loops back to step 42. Otherwise, the process flow proceeds to step 46.

In an alternative embodiment, the lifeline may be constructed so that all invited users are added to the lifeline in a provisional inactive state. The users may then be asked in parallel whether they accept being included in the lifeline when they become available. If the users accept, then they are activated within the lifeline. If the users reject the invitation, then they are removed from the lifeline. This alternative embodiment functions asynchronously and allows the lifeline to begin use immediately, without requiring the availability of all of the invited users.

At step 46, a number of ordering attributes may be defined, that are used to control the selection of individual ones of the users within the lifeline for specific requests for activities or tasks. Such ordering attributes may indicate that users within the lifeline are to be selected randomly over sequentially received requests, or on a round robin basis. Alternatively, a specific ordering may be defined within the list, setting forth a specific order of selection to be applied to the users within the lifeline for requests processed over time, and potentially in response to the availability of users within the lifeline. The ordering defined at step 46 may be defined so that the users in the lifeline are displayed to users issuing requests designating the lifeline in a request, thus enabling a requesting user to specify the desired lifeline member for a given request. At step 47, the lifeline is distributed to some set of users, who may add the lifeline to their contact list. For example, the "product_A_tech" lifeline mentioned above might be distributed to members of the sales force responsible for selling product A. When such a sales person subsequently has a need to contact a technical support person, they can then generate a request indicating the "product_A_tech" lifeline without needing specific knowledge of the individual users within the lifeline. In the preferred embodiment, each user within the "product_A_tech" lifeline may either accept or reject such contact in real-time, for example, via a dialog box like the one described above. In this way, users are given opportunities in real-time to either accept or reject invitations to join online meetings or teleconferences.

Figure 4:
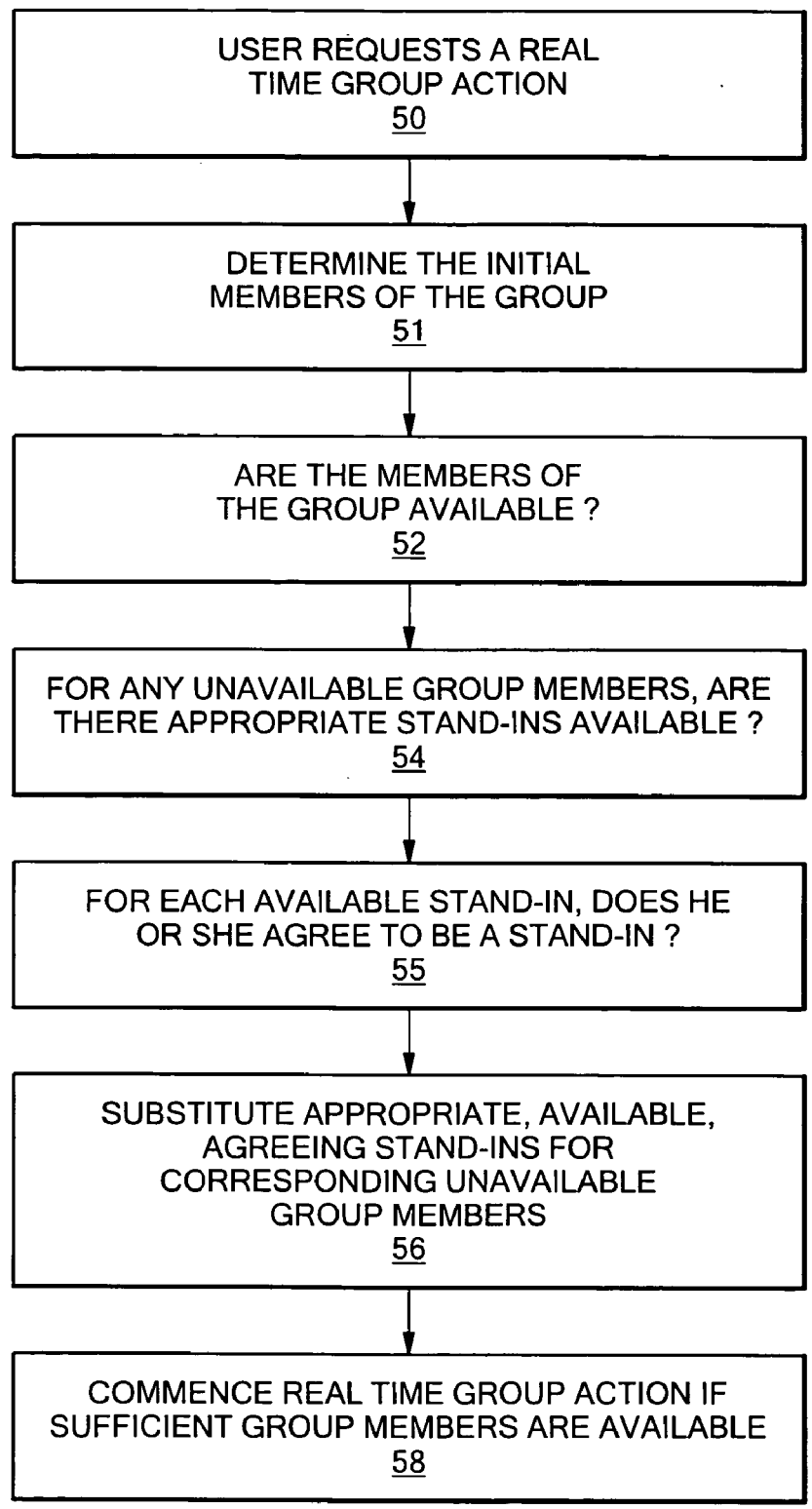
FIG. 4 is a flow chart showing steps performed during operation of an illustrative embodiment to process requests for real time group actions.

FIG. 4 is a flow chart showing steps performed by an illustrative embodiment of the disclosed system to initiate a real time group action. At step 50, a user generates a request for a real time group action, for example through a graphical user interface on a client system. An example of a request for a real time group activity is a request to convene a meeting. The calling of a meeting may involve entering a list of participants in the action, for example meeting invitees. The list of action participants specified by the user calling the meeting form what is referred to herein for purposes of explanation as the "participant group" for the action. Moreover, the user requesting the group action may indicate a number of attributes associated with the request, and/or one or more users specified in the participant group. For example, the user calling a meeting may indicate a meeting topic, location, time and/or priority. The attributes associated with members of the participant group may include a function or role associated with one or more of the meeting group members, as well as whether a meeting group member is necessary for the meeting to be held or optional. For example, a participant group member might be associated with a function such as "finance", or "technical", indicating a role that that user will be expected to fulfill in the meeting.

Additionally, the disclosed system may allow for the members of the meeting group to be defined by designation of a predetermined group or lifeline. Such a predetermined group or lifeline definition may be configured by the user, or made available to specific users, or to all users on a system-wide basis. For example, in a deployment of the disclosed system by a given company, a predefined group might be defined to include the members of a senior management team for the company. Moreover, an individual user within the company may set up or configure his or her own account to include one or more named groups of users that are relevant to that user's day to day activities, such as a "project team" group including all members of that user's current project team.

At step 51, the disclosed system determines the initial members of the participant group. In the case where the request defined at step 50 includes designation of a lifeline, at step 51 the disclosed system applies the selection attribute(s) associated with the lifeline to the lifeline, and determines which specific member of lifeline is to be considered one of the members of the participant group for the request. The determination of which member of the lifeline is to be added to the participant list is potentially further responsive to current availability status of the lifeline members, depending on presence information, attributes of the request, and/or user defined availability filters.

At step 52, the disclosed system determines whether each individual within the participant group is available. The availability of each participant group member may be determined based on user defined availability filtering, and depend on the attributes associated with the request, such as who called a meeting, a meeting topic, and/or whether a participant group member is defined as a necessary attendee for a meeting. The availability of each participant group member is further determined in response to the online presence of each meeting group member, as stored in the real time messaging server.

At step 54, for any participant group members that were determined to be unavailable, the disclosed system operates to determine whether there are any acceptable stand-ins available. For example, if a given participant group member has defined a stand-in to be provided for any meeting called when that meeting group member is unavailable, and that participant group member is in fact unavailable, then the system determines whether the stand-in is currently available. Again, the availability of any stand-in may be determined using the stand-in's availability filter, and depend both on the stand-in's online presence, and/or attributes associated with the request generated at step 50. In some cases, the disclosed system may act to automatically determine alternative participant group members or stand-ins. Alternatively, the requesting user may be given the option of approving any stand-ins before they are substituted into the participant group for the requested action. Additionally, the requesting user may be given the option to designate participant group members as being non-essential to allow a meeting to convene if there is no acceptable stand-in available.

At step 55, for each stand-in that is determined to be available, the disclosed system operates to determine whether he or she agrees to be a stand-in. In the preferred embodiment, the potential stand-in is given an opportunity in real-time to make an express acceptance or rejection of the invitation to serve as a stand-in (e.g., via a dialog box within the graphical user interface) before being designated as a substitute for an unavailable group member.

At step 56, the disclosed system substitutes any available, appropriate, and agreeing stand-ins into the participant group. The appropriateness of any potential stand-in identified by the system may be determined by presenting the potential stand-in to the original user that initiated the request. For example, if the caller of the meeting finds the proposed stand-in acceptable, the caller may indicate the appropriateness of the stand-in to the system through the user interface.

At step 58, the real time group action is commenced if there are sufficient participant group members available. For example, in the case of a request for a meeting, if there are sufficient members of the requested meeting group available, and all the necessary members of the meeting group are available, including any stand-ins determined at step 56, the disclosed system operates to convene the requested meeting at step 58. As described above with reference to FIG. 3 (i.e., the process of configuring of a lifeline), each group member or stand-in may either accept or reject being included in the requested meeting, for example, via a dialog box within the graphical user interface. In this way, group members or stand-ins are provided opportunities in real-time to either accept or reject requests to join online meetings or teleconferences. It is noted that in the event the real time group action cannot be immediately activated, the requesting user may be offered the option of performing the group action once all of the members are available.

Figure 5:
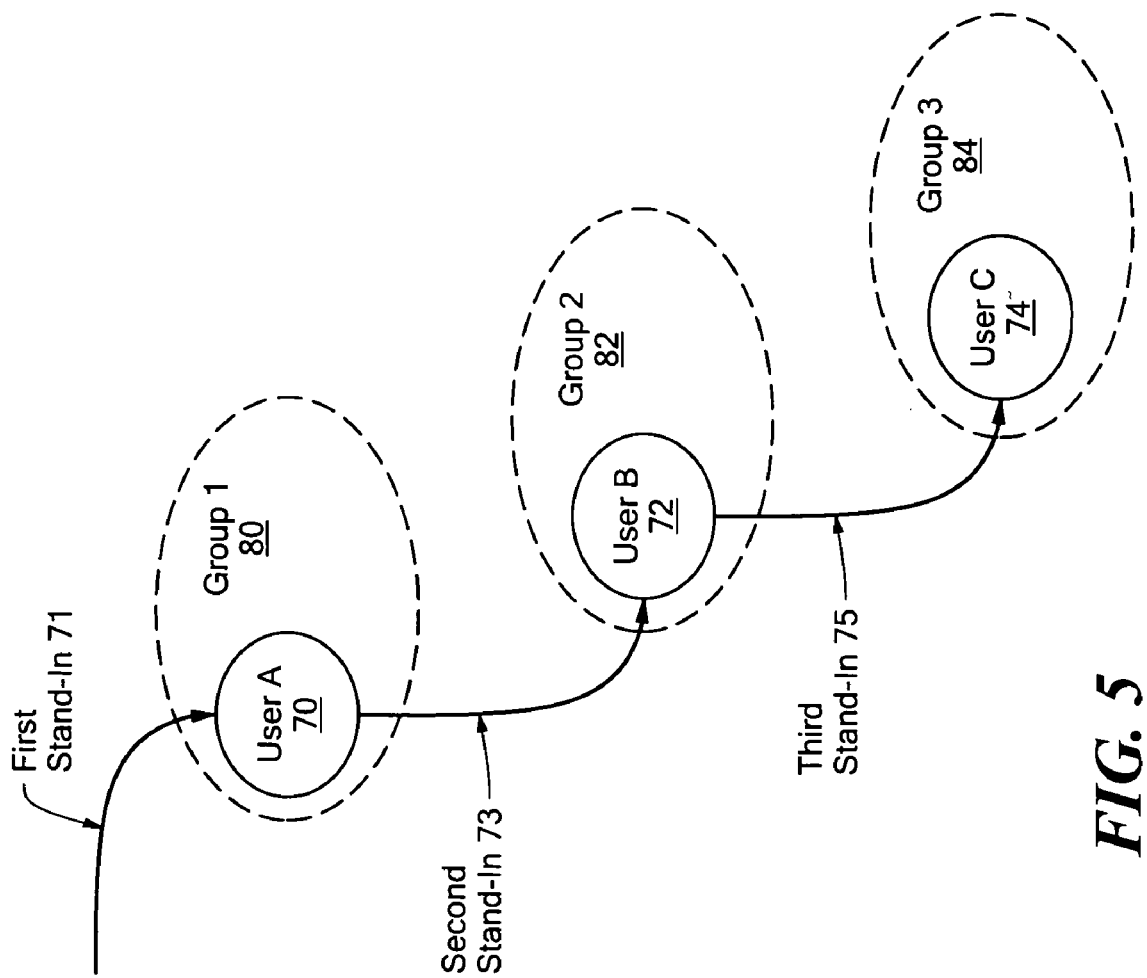
FIG. 5 illustrates transitivity of delegation in the disclosed system.

FIG. 5 illustrates the transitivity of delegation to stand-ins across multiple user groups in an embodiment of the disclosed system. As shown in FIG. 4, the disclosed system operates to determine a first stand-in 71 by selecting user A 70 from Group 1 80. For example, the first stand-in 71 is selected when a first meeting invitee is determined to be unavailable. The unavailable invitee had previously defined a stand-in either by designating user A 70, or by designating Group 1 80. For example, in the case where the expertise associated with an requested participant for a requested meeting is finance, a user A 70 may automatically be selected as a stand-in from Group 1 80, based on the fact that user A 70 serves the finance function within Group 1 80. However, if at the time the meeting was called, user A 70 is also not available, and assuming that either user B 72 or Group 2 82 is defined as a stand-in for either User A 70 or Group 1 80, the disclosed system then operates to find identify user B 72 as a stand-in for user A 70. For example, if User B 72 is defined as a finance expert within Group 2 82, User B 72 may automatically be selected as a stand-in for the meeting by the second delegation 73. As shown in FIG. 4, if User B 72 is also unavailable for the meeting, and either user C 74 or Group 3 84 has been designated as the stand-in for either User B 72 and/or Group 2 82, user C 74 is selected to join the meeting group by the third stand-in operation 75, for example resulting from the definition of user C 74 as the finance function user within Group 3 84.

Figure 6:
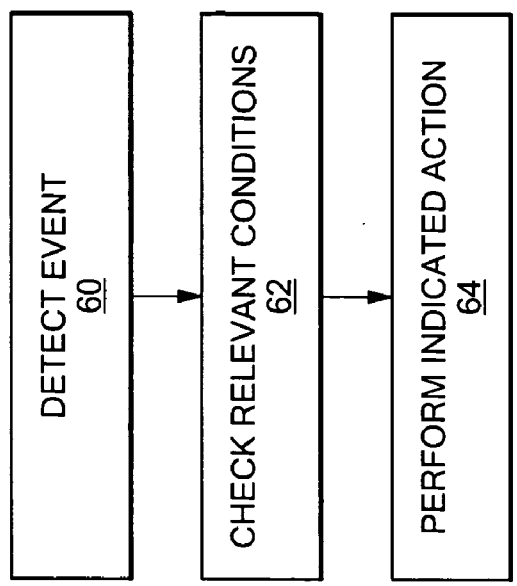
FIG. 6 is a flow chart illustrating steps performed during operation of an illustrative embodiment of the disclosed rules engine.

FIG. 6 illustrates steps performed during operation of the rules engine 30 as shown in illustrative embodiment of FIG. 1. At step 60, the rules engine 30 detects an event notification 36, such as a presence related notification. Such a presence related notification may indicate whether a specific user has either gone on or off line. After step 60, at step 62, the rules engine checks the relevant data in the ephemeral condition cache 38. The checking performed at step 62 may, for example, be performed by a script that was previously generated by the rules engine 30 in response to a previous event notification. Accordingly, the checking performed at step 62 may be different from the checking originally performed in connection with a given request that could not be accommodated. At step 64, the disclosed system performs an action based on the determinations at step 62 and the event detected at step 60.

Figure 7:
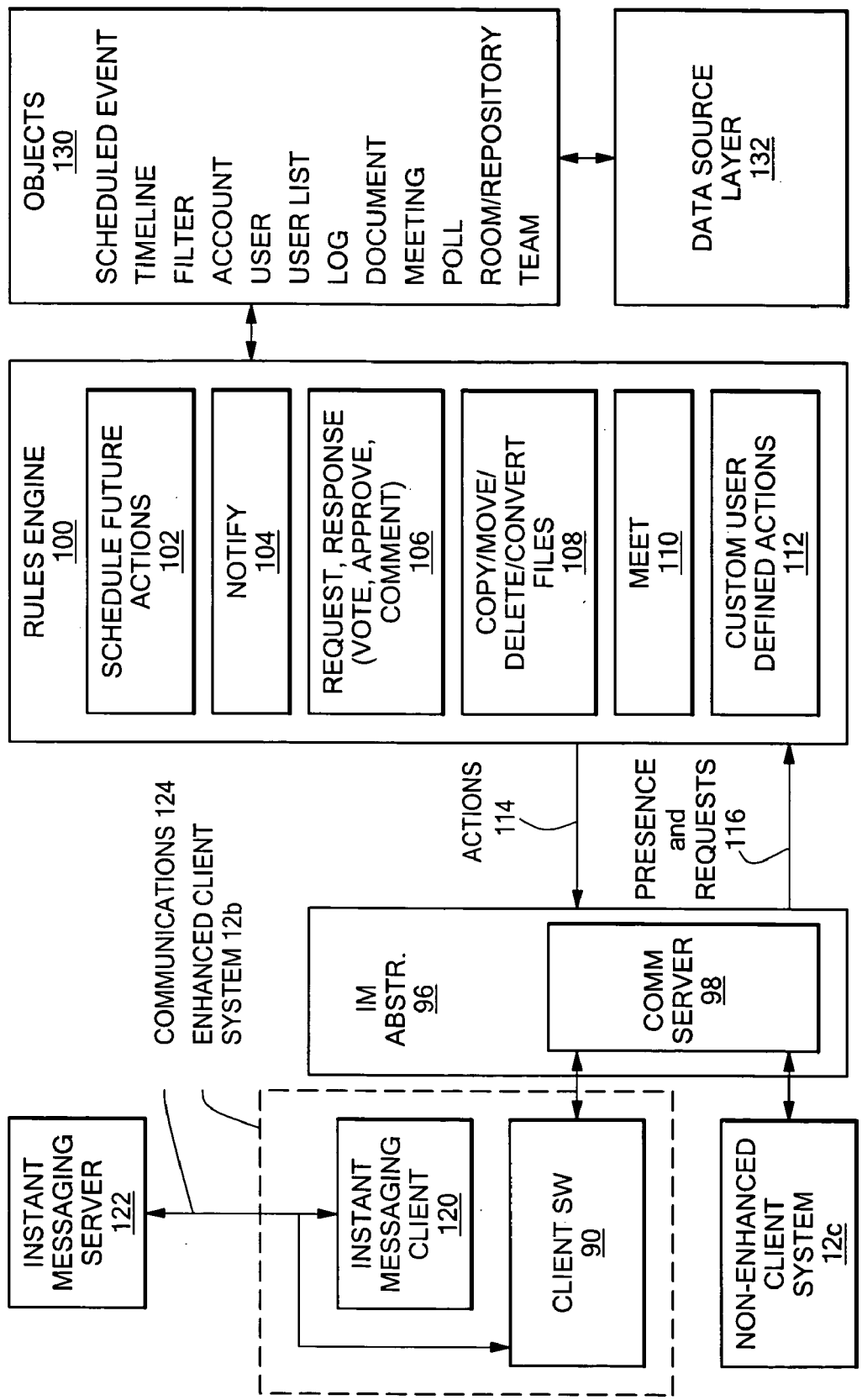
FIG. 7 is a block diagram showing structure and operation of the disclosed system in an illustrative embodiment.

FIG. 7 shows an illustrative embodiment of the disclosed system including a rules engine 100. The illustrative rules engine 100 is shown having several examples of functional units, each of which performs a number of associated real time communication activities. As shown in FIG. 7, a schedule future actions unit 102 is provided for scheduling actions to be performed at later points in time, a notify unit 104 is provided for performing notification actions, and a request, response (vote approve, comment) unit 106 is provided for supporting certain types of request and response actions related to voting, approval and commenting. A copy/move/delete/convert files unit 108 is further provided to support file operations performed by the rules engine, a meet unit 110 is provided to support convening meetings, as well as a custom user defined actions unit 112. The specific functional units shown in the rules engine 100 of FIG. 7 are shown for purposes of illustration only, and any appropriate functional units may be included within the rules engine 100 for a given embodiment. The functional units within the rules engine 100 define the processing performed by the rules engine 100, and may reflect a specific set of rules loaded into the rules engine 100.

The rules engine 100 is shown interfacing to a data source layer 132 through a number of object definitions 130. The object definitions 130 provide a predetermined interface to data sources such as ephemeral data, events, and one or more persistent databases contained in the data source layer 132. In addition to a relational database provided with the system for storing its own information, the data source layer 132 may also include external sources of data such as a corporate directory.

The rules engine 100 further operates to receive and process presence information and requests 116 from the instant messaging (IM) abstraction 96. The presence information received from the IM abstraction reflects the online status of one or more users with respect to one or more client systems. The requests received from the IM abstraction consist of requests for real time group activities, such as requests to convene meetings and/or send messages between users. As a result of processing the presence information and requests 116 received from the IM abstraction 96, the rules engine 100 issues the actions 114 back through the IM abstraction 96. For example, actions may include any real time group action, such as the convening of an online meeting or teleconference, and/or the passing of messages between users.

The client abstraction 96 is shown including a communication server 98 for communicating with a non-enhanced client system 12c. An enhanced client system 12b, is further shown in FIG. 7. The enhanced client system 12b includes client software 90, as well as a third party instant messaging client 120. The third party instant messaging client 120 may be any instant messaging client software, such as, for example, AIM™ (AOL (AmericaOnline™) Instant Messenger), Yahoo® Chat, Microsoft® MSN Messenger, Microsoft® Windows Messenger, and/or IBM® Lotus® Instant Messaging and Web Conferencing clients. The instant messaging client 120 communicates with an instant messaging server 122 over a network such as the Internet. During operation of the disclosed system, the client software 90 intercepts communications between the instant messaging client 120 and the associated instant messaging server 122 to determine the online presence status of one or more users of the instant messaging client 120.

Figure 8:
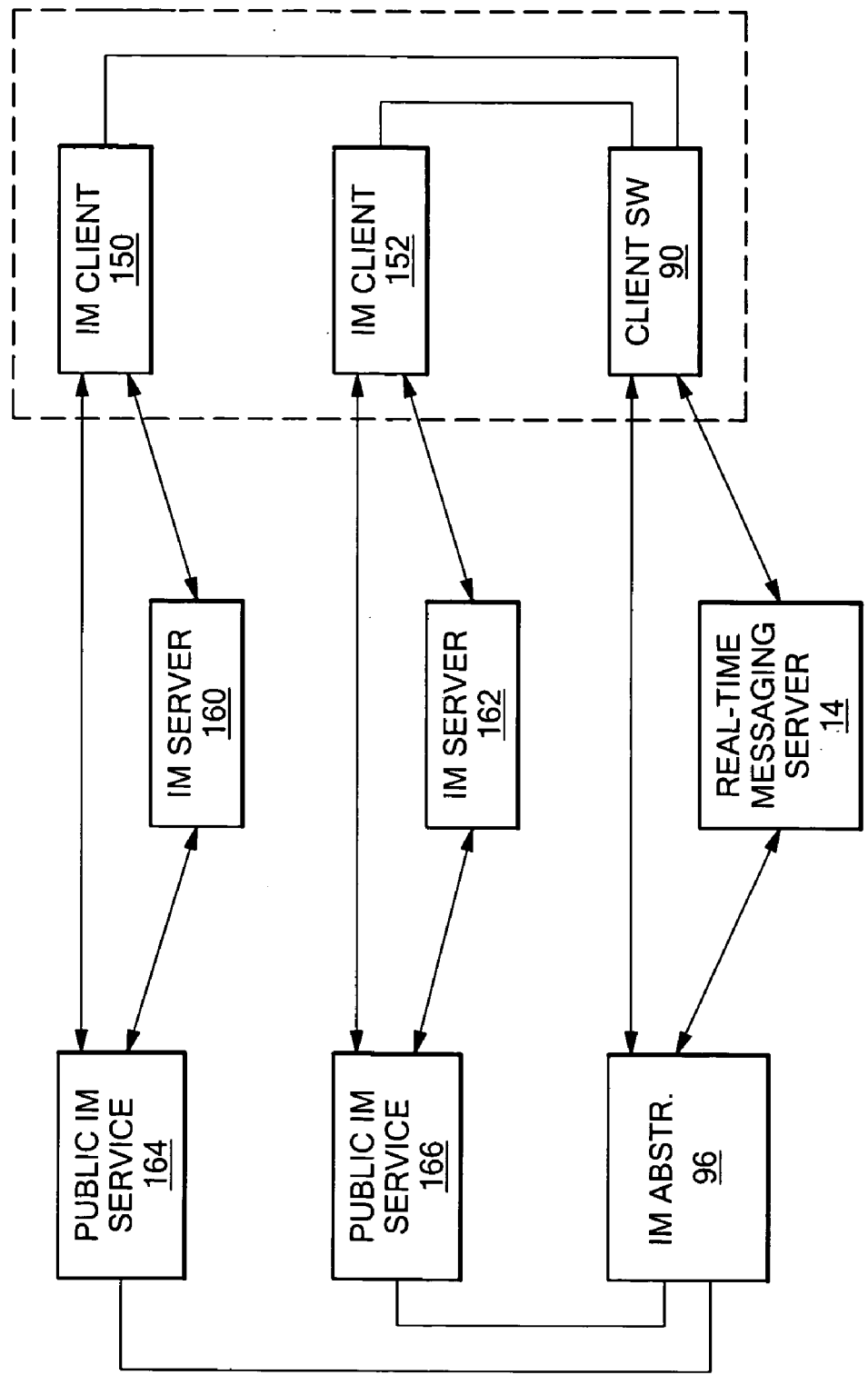
FIG. 8 is a block diagram illustrating the disclosed system interfacing with other instant messaging systems.

FIG. 8 illustrates how presence information flows to an embodiment of the disclosed system, which operates to determine user presence information from one or more separate instant messaging software systems. As shown in FIG. 8, instant messaging (IM) software clients 150 and 152 provide presence information regarding users both to respective instant messaging (IM) servers 160 and 162, as well as directly to respective public instant messaging (IM) services 164 and 166. The presence information provided from the IM clients 150 and 152 flows from the public IM services 164 and 166 to the IM abstraction 96, for example through predetermined interfaces between the IM abstraction 96 and the public IM services 164 and 166. Alternatively, as noted above, the client software 90 intercepts presence information sent to the IM client 150 and IM client 152 and, in turn, sends that information to the real-time messaging server 14, and directly to the IM abstraction 96. Additionally, user presence information is provided directly by the client software 90 to the real-time messaging server 14, and directly to the IM abstraction 96. The aggregated presence information collected through the IM abstraction 96 therefore reflects user presence as determined by each of the IM client 150, IM client 152, and client software 90. As noted above, the instant messaging client software 150 and 152 may be any instant messaging client software, such as, for example, AIM™ (AOL (AmericaOnline™) Instant Messenger), Yahoo® Chat, Microsoft® MSN Messenger, Microsoft® Windows Messenger, and/or IBM® Lotus® Instant Messaging and Web Conferencing clients. These and various other instant messaging systems may be considered "external" instant messaging systems with regard to the disclosed system.

Thus, in the case where a user may be using or associated with client software of the disclosed system, and/or client software of one or more external instant messaging systems, presence information from one or more of those clients associated with or being used by that user may be aggregated prior to application of any user configured availability filtering. Moreover, presence information may reflect use of the disclosed system or external instant messaging client software through various communication mediums, including PDAs (Personal Digital Assistants) and/or telephones, as well as client software running on client computer systems.

In addition, the disclosed system may operate to use all facilities of such "external" instant messaging systems through which user presence or other information may be obtained. For example, the disclosed system may operate to send a meeting invitation to a user through an external instant messaging system. Such an invitation would include a pointer, such as a URL, to a resource such as a Web page on the real-time messaging server. When the receiving user clicks on the URL, they are able to begin participating in the real-time action, in this case an online meeting. The online meeting may be provided as content provided through the Web page indicated by the URL. Such invitations may be sent by the disclosed system to users, including users on non-enhanced client systems, as part of the process for convening an online meeting. In one embodiment, the invitation instant message is transmitted from an enhanced client system to a non-enhanced client system, by operation of the client software of the disclosed system introducing the instant message invitation into the communications between the external instant messaging client software, shown as instant messaging client 120 in FIG. 7, and the external instant messaging server, shown as instant messaging server 122 in FIG. 7. The user that is requesting the meeting may trigger the convening of the meeting at the enhanced client system, thereby causing the disclosed client software, shown as client software 90 in FIG. 7, to introduce the invitation instant message into the communications between the external instant messaging client and the external instant messaging server 122. In this way, users at non-enhanced clients may be invited to and participate in real-time actions through operation of the disclosed system.

FIG. 9 shows an example of the logical structure of rules that control the operation of the rules engine. As shown in FIG. 9, a number of illustrative events 172 and conditions 174 are used by the disclosed system to determine what appropriate actions 176 are to be taken. The specific relationships between events, conditions, and actions depend on the specific rules loaded into the disclosed system. The rules in the disclosed system may be pre-programmed as part of a software program, or may be user configurable. As shown in. FIG. 9, the events 172 reflect the "when" logic of the rules, in that they trigger the testing of certain associated conditions. Similarly, the conditions 174 represent "if" logic, in that the state of a given condition determines whether a related action is performed. Finally, actions 176 are the "then" portion of the logic within the rules provided to the rules engine, in that they are performed as a result of the occurrence of an associated event as well as the potential testing of one or more associated conditions. The events that can be monitored may indicate presence changes with regard to one or more users, such as automatic detection of when a user goes on or off-line, or the explicit indication by a user that they are present through a user interface, or a user defined indication of availability. Additionally, presence related events may result from detection of user actions that imply whether the user is currently available, such as the user entering or leaving an on-line meeting, picking up or hanging up the phone, or beginning or ending certain activities within a meeting, such as a presentation. Events may also be time related, indicating the arrival of a specific time, a recurring time, an elapsed time, and/or user inaction. Invitations are another form of event, such as invitations to meetings, or to join a group or team. The events 172 may further include indication of a system condition, or consist of a trigger or message from some third party application software. Events may further include any type of user generated request or message passed to or through the disclosed system.

The conditions 174 may reflect the receipt of previous event notifications. For example, the conditions 174 may reflect automatically generated or user defined presence information, as well as the availability of various specific devices and/or resources that may be needed to perform an action. The conditions 174 may further reflect data stored in the disclosed system that indicates the contact preferences of a user, or the identity of a participant in a request, where that user might be designated by personal identifier, lifeline membership, location, and/or group membership. The actions 176 performed by the rules engine may include various types of communication activities, such as different types of notifications, including instant messages, e-mail and/or short message service (SMS) messages. The actions 176 performed by the disclosed system further may include convening of an online or other type of meeting, scheduling of a meeting in the future, initiating a call or conference call, routing a message between users, broadcasting a message to some or all users, contacting a stand-in for delegation purposes within a group or as part of a request, leaving a message for user, transferring a thread of control to user, and/or retracting some previously performed action.

Based on the user presence information gathered by the disclosed system, a request for real-time communications can be intelligently routed. For example, in the case where a user (referred to for purposes of explanation as the sender) needs to reach someone to ask a question, the disclosed system enables the convenient performance of the following three operations:

1. Identify a candidate recipient. This may entail looking up an expert on a topic, or a user that is assigned as the "programmer of the day", for example based on information stored in the database.

2. Select a method to contact that person, such as by sending an instant message to one or more accounts, sending a Short Message to their mobile telephone, or calling them on the telephone at the office or at home.

3. If the desired person is not available, selecting a person who the first identified recipient may have designated as a stand-in to receive communications when they are not available.

The steps above may need to be applied recursively, as part of trying alternative methods to reach a stand-in, such as calling the stand-in of a stand-in.

Those skilled in the art will recognize that the disclosed system may provide a simple, data-driven mechanism for users to specify how the above steps should be performed, such as by filling in a form in a graphical user interface with contact information and names of stand-ins. Moreover, the disclosed system provides a mechanism for organizations to define rules and operations that fit their own specific business processes.

Additionally, the disclosed system supports operations that span multiple days. For example, a sender may issue a request that a conversation take place when a specified recipient becomes available, in which the request indicates that the system should continue to wait for that recipient's availability for hours, days, or weeks. Since the system provides this service to a potentially large number of users, it provides an efficient way for the information about such requests to be stored and retrieved, since it is impractical to keep a process running in a server for each such request.

As described above, the clients employed with the presently disclosed system are configured to execute software programs operative to perform system functions in cooperation with the real-time messaging server. FIGS. 10–16 depict flow diagrams of illustrative functions that may be performed by the client systems and the real-time messaging server. In FIGS. 10–16, the following definitions are employed:

1. "Engine" refers to an instance of the rules engine. In general, any action marked "Engine" may run on any instance of the rules engine 30 (see FIG. 2).

2. "Lifeline Broker" is a special component within a rules engine, responsible for tracking user requests to meet with lifelines. It maintains these requests in a queue, and also tracks the availability of lifeline resources by communicating with a visibility server, which is a subset of the ephemeral condition data cache 38 (see FIG. 2) that keeps track of each user's online state. When lifeline resources are available, it assigns them to specific requests. In the preferred embodiment, the request queue is ephemeral (for efficiency), but the information necessary to reconstruct the queue is stored in the persistent database, so that it can recover in case the ephemeral data source crashes.

3. "LifelineSvc" refers to a Lifeline Service. This is a special instance of a rules engine, which includes a Lifeline Broker. It can thereby perform a superset of the rules and actions available to rules engines that do not contain a Lifeline Broker. In the preferred embodiment, there are many lifeline services, each maintaining a pool of lifelines, or a pool of users within a single lifeline, thereby permitting the system to scale indefinitely.

4. "MtgSvc" refers to a Meeting Service. This is a process within the Real-Time Messaging Server that provides central communications services for meetings. In the presently disclosed embodiment, each meeting is associated with a specific Meeting Service while it is actually in progress.

5. "DOM" refers to the Domain Object Model, which includes the Objects 130 (see FIG. 7) and provides communications with the Data Source Layer 132 (see FIG. 7).

6. "Client" refers to a Real-Time Messaging Client 12*a*–12*c* (see FIG. 1).

Figure 10A:
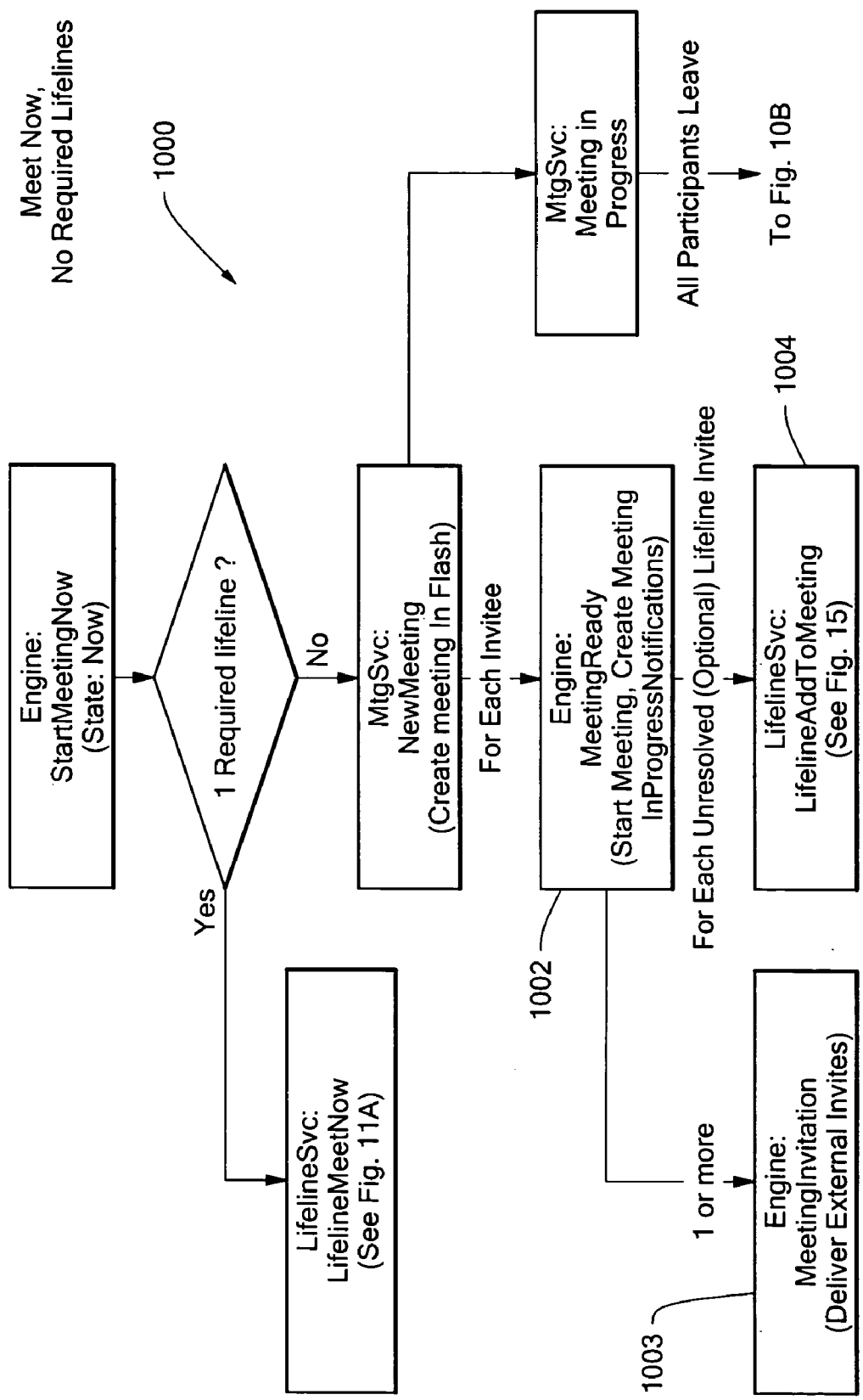
FIGS. 10–13 are flow diagrams of illustrative functions that may be executed by clients and servers within the disclosed system.
Figure 10B:
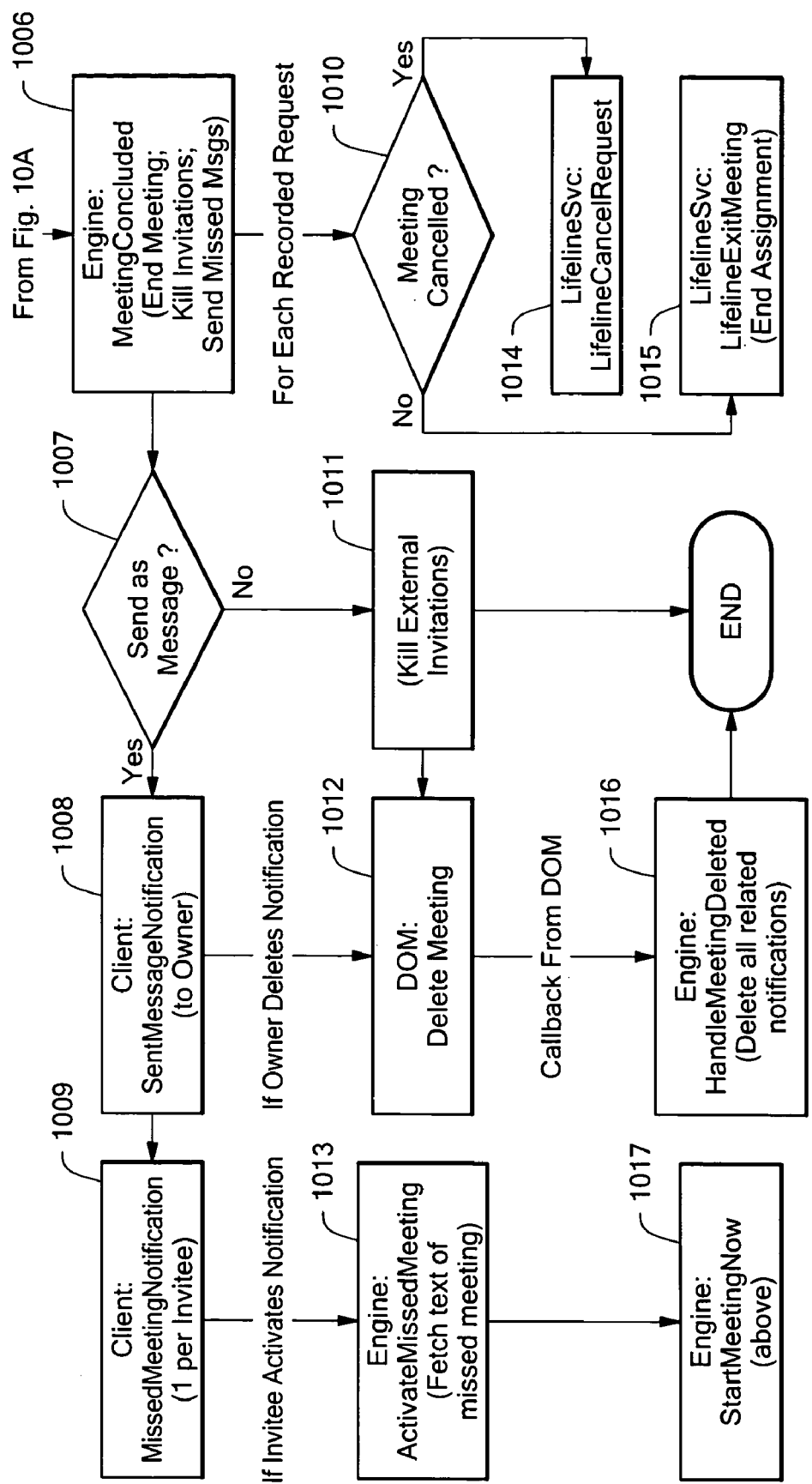

FIG. 10 depicts an illustrative function 1000 for immediately starting a meeting ("Meet Now 0"), in which no lifelines are required for holding the meeting. For example, the "Meet Now 0" function 1000 includes steps 1002–1004 for notifying meeting participants that the meeting is about to be in-progress and for delivering invitation messages to the participants, and steps 1006–1017 for performing housekeeping tasks required to conclude the meeting (e.g., "End Meeting", "Kill Invitations") and for handling any messages that may have been missed by the participants while the meeting was in-progress.

Figure 11A:
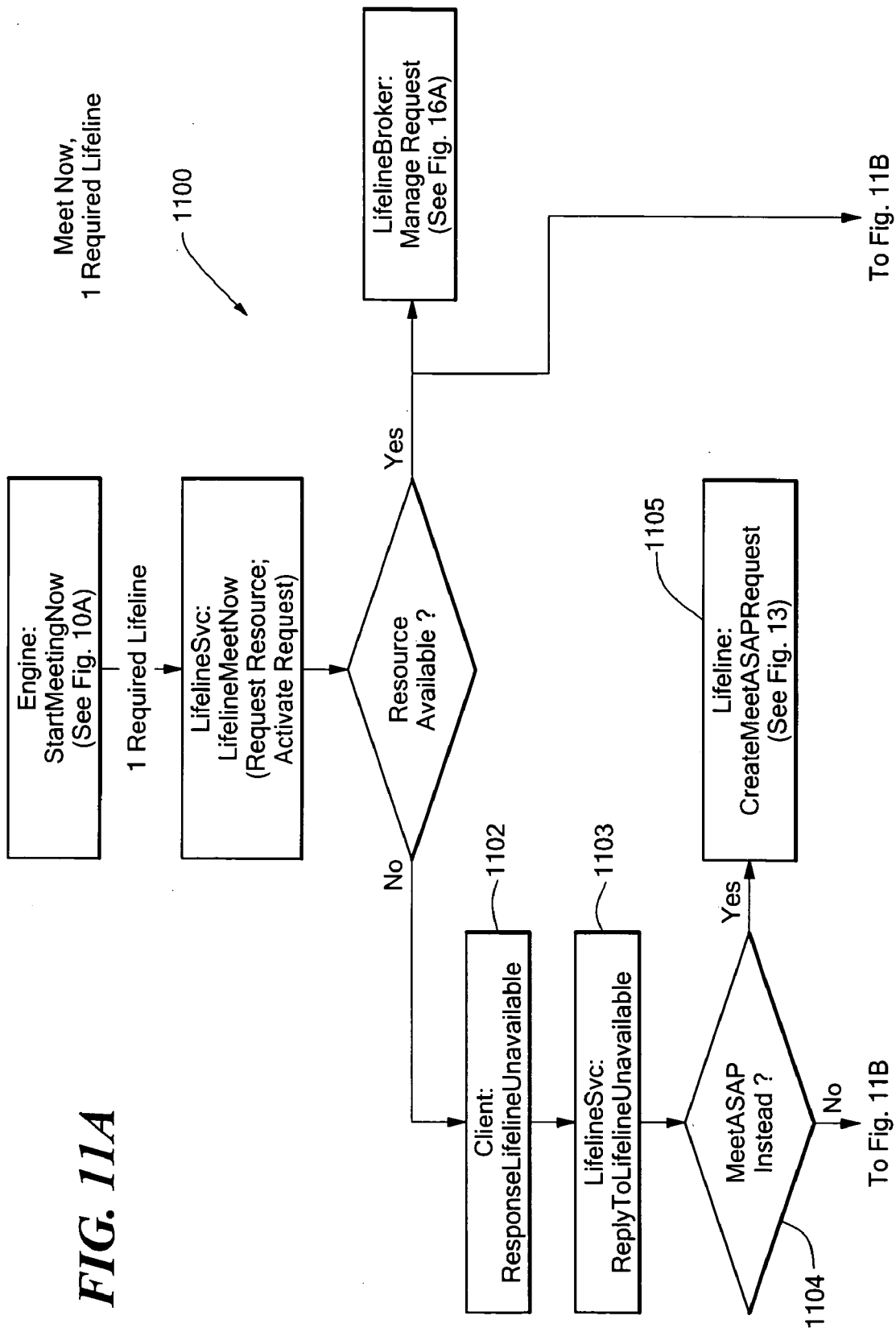
Figure 11B:
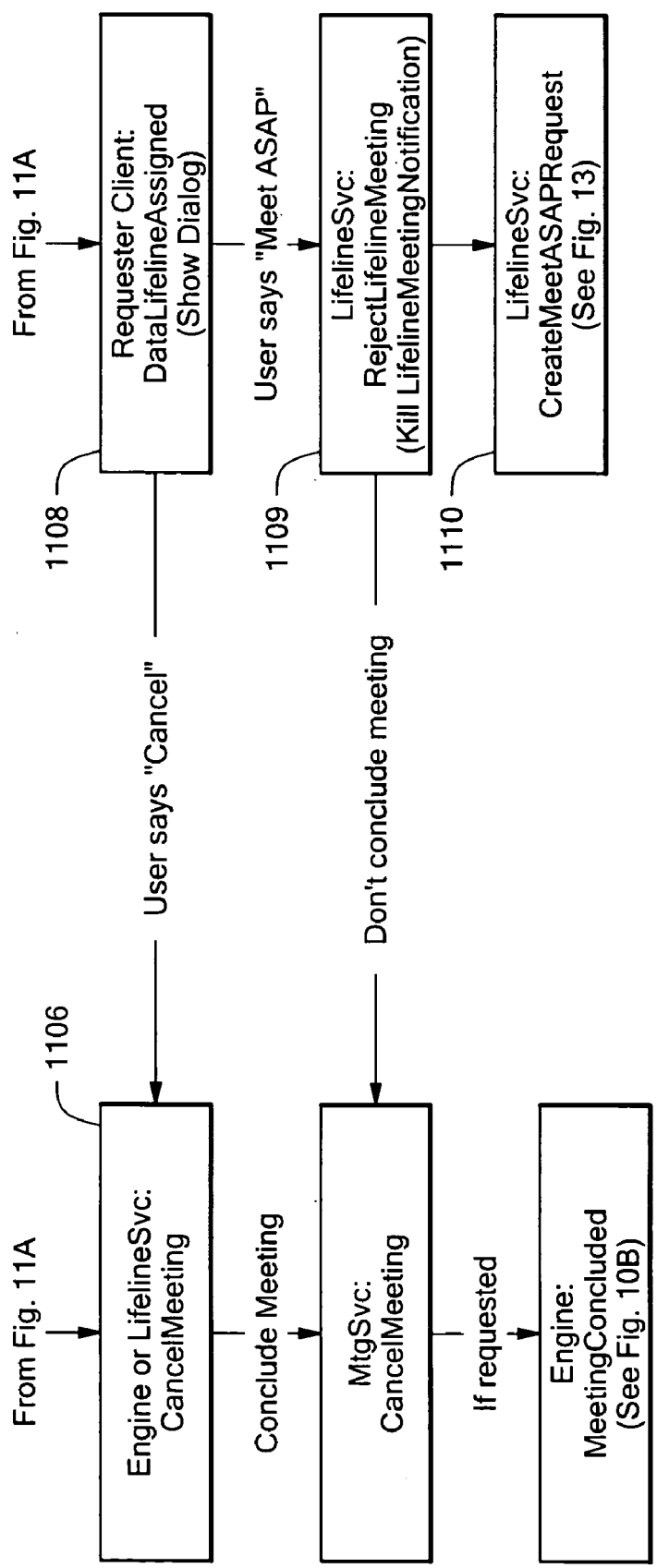
Figure 13:
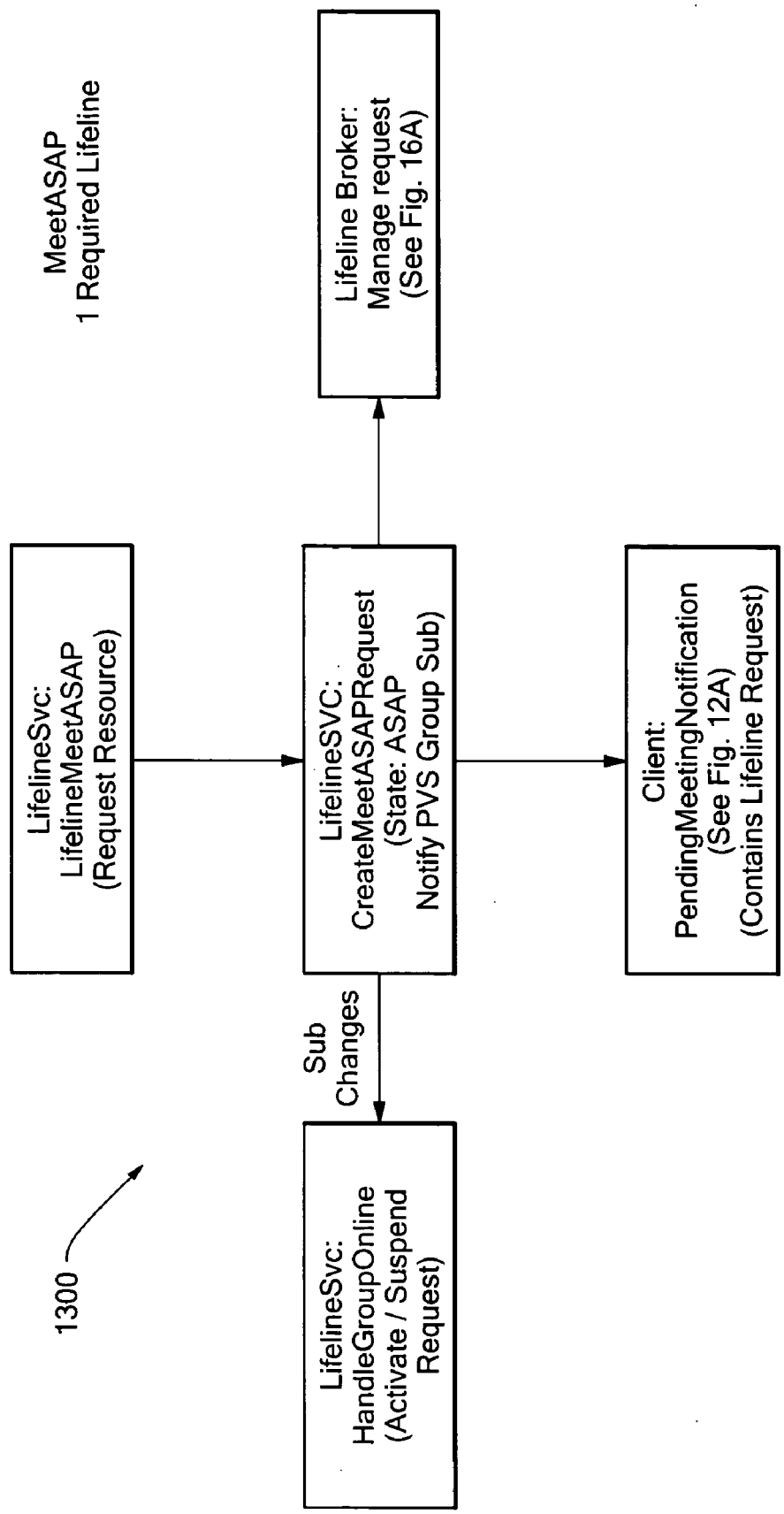
Figure 16A:
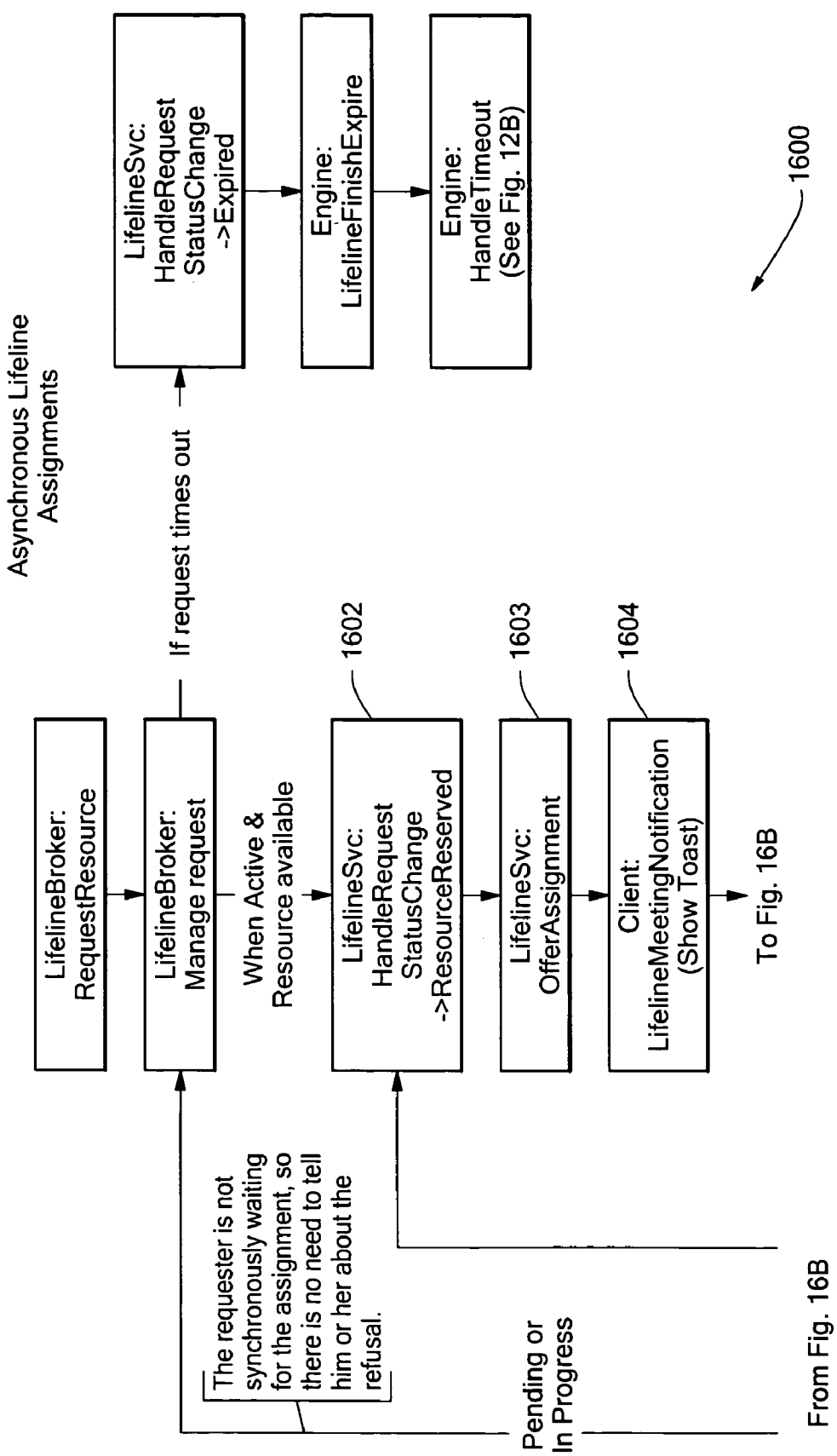
FIG. 16 is a flow diagram of an illustrative method of performing asynchronous lifeline assignments.
Figure 16B:
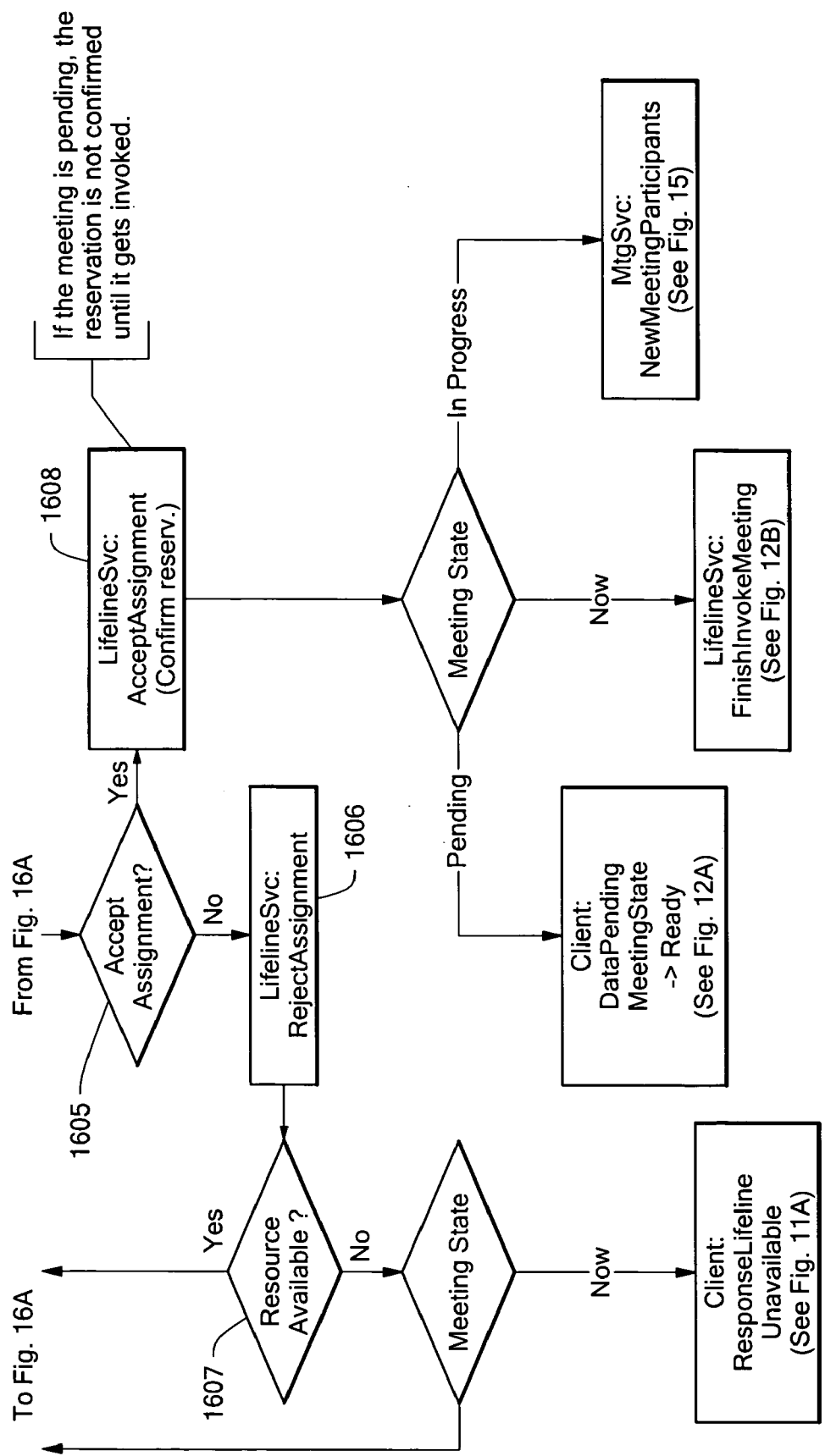

FIG. 11 depicts an illustrative function 1100 for immediately starting a meeting ("Meet Now 1"), in which one lifeline is required for holding the meeting. For example, the "Meet Now 1" function 1100 includes steps for handling the lifeline when sufficient resources within the system are both unavailable (steps 1102–1106) and available (steps 1107–1110). In the event there are insufficient resources available, a user may choose to create a request to meet as soon as all of the participants are present (ASAP; see the steps 1104–1105). Steps 1108–1110 provide the requesting user with the option of canceling the lifeline request or converting it to a Meet ASAP request, while the system is determining whether any lifeline resources are willing to accept the meeting invitation. These options are withdrawn when the meeting actually begins. FIG. 13 depicts an illustrative function 1300 for creating the "Meet ASAP" request employed in the "Meet Now 1" function 1100 (see FIG. 11), in which one lifeline is required. Moreover, FIG. 16 depicts an illustrative function 1600 for handling asynchronous lifeline assignments in the event sufficient resources are available within the system. As shown in steps 1602–1608, the function 1600 includes provisions for handling lifeline assignment offers, lifeline meeting notifications, and user acceptances/rejections of the lifeline assignment offers.

Although FIG. 13 depicts the "Meet ASAP" request function 1300 with one required lifeline, it is possible within the presently disclosed system architecture to convene a "Meet ASAP" meeting with multiple required lifelines. In the presently disclosed embodiment, however, such a meeting may result in inefficient reservations of peoples' time. Because the system resolves a lifeline to an individual in order to declare the individuals "present" and to reserve their time during the meeting, convening a "Meet ASAP" meeting with multiple lifelines means that the time of the first lifeline resource would have to be reserved indefinitely, for a meeting that might not be startable due to the second lifeline not being resolvable to a resource that is willing to accept it yet. In an alternative embodiment, the system may reserve the first lifeline resource for a predetermined period of time while it attempts to resolve the second lifeline resource.

Figure 12A:
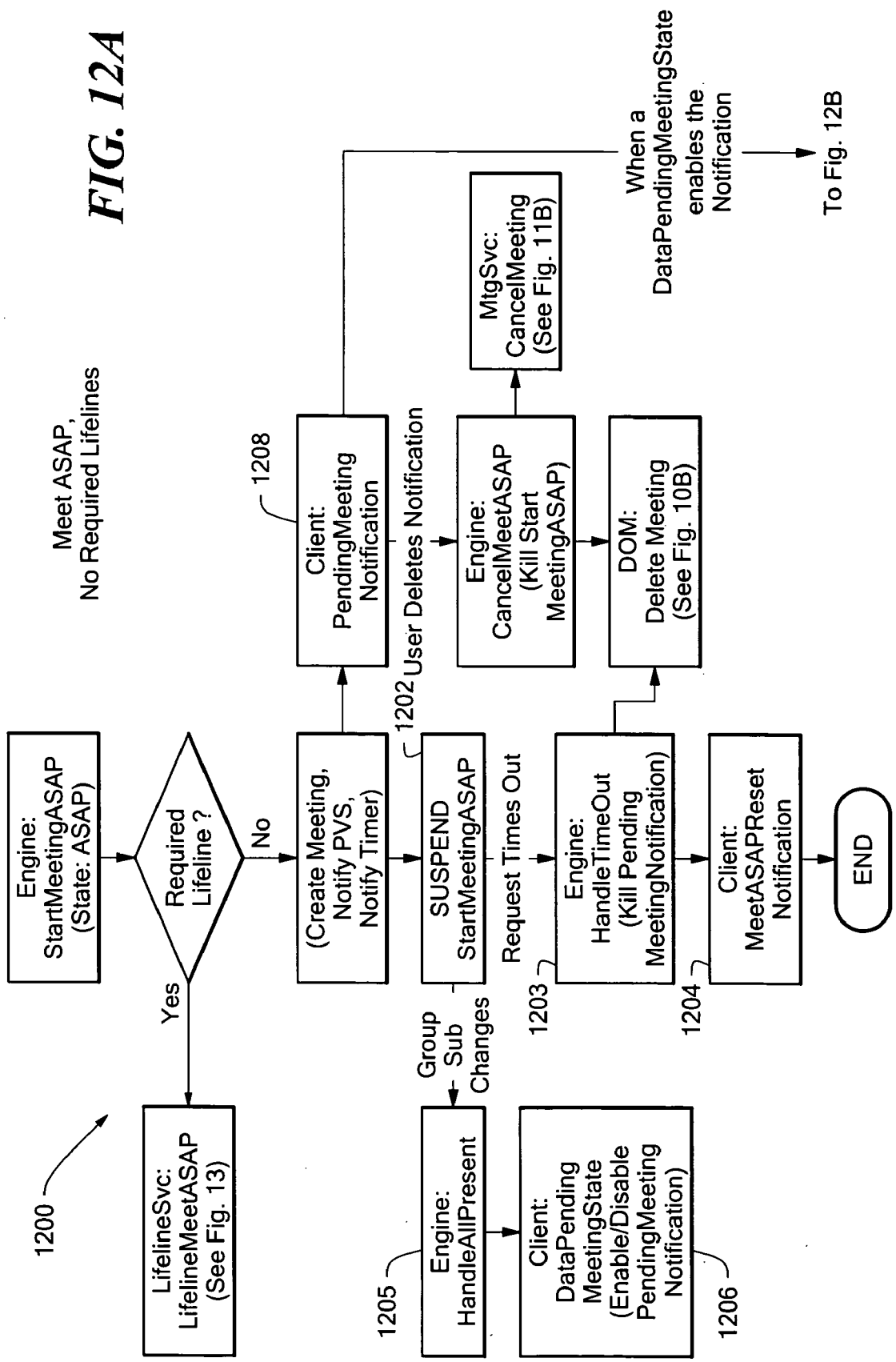
Figure 12B:
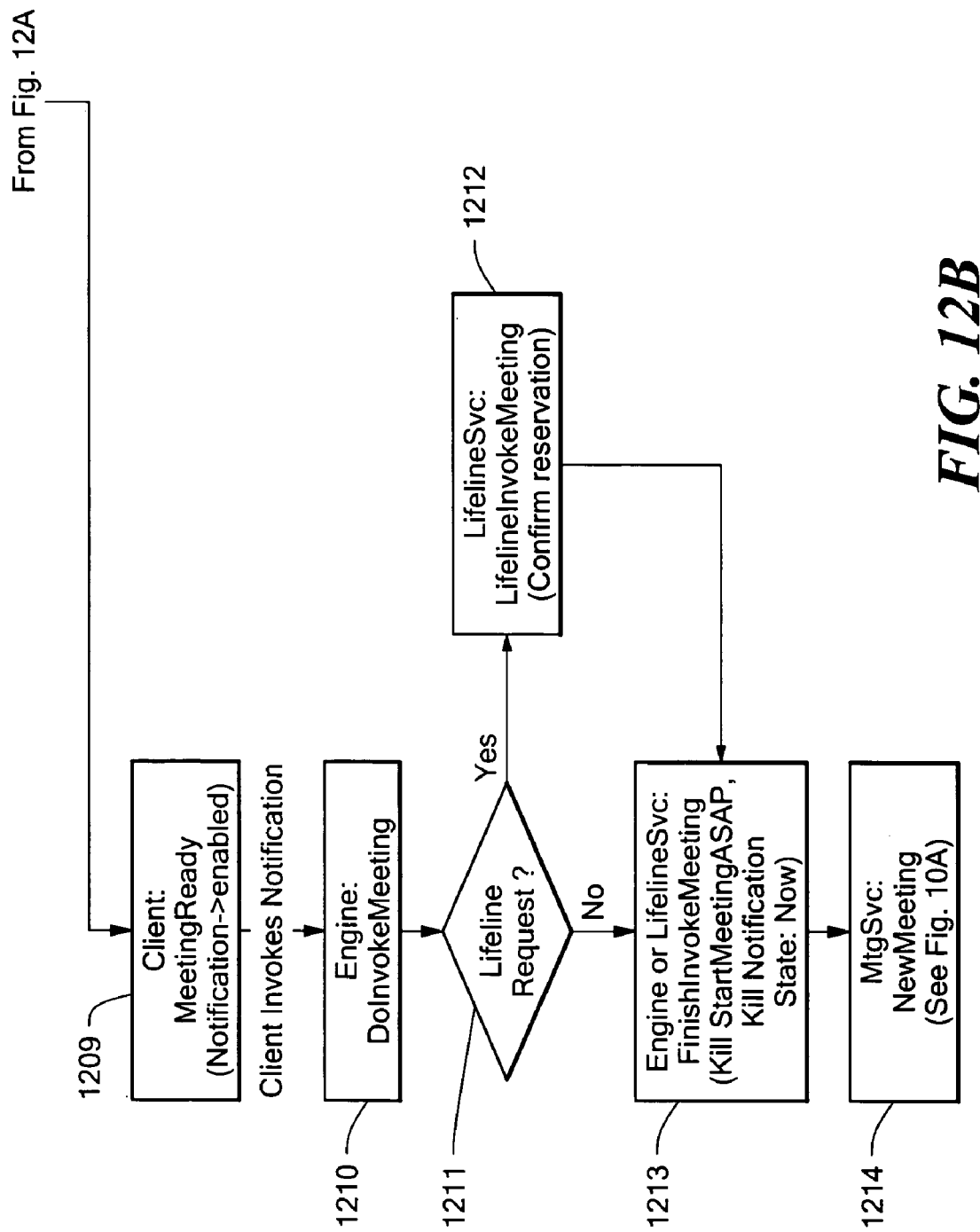

FIG. 12 depicts an illustrative function 1200 for starting a meeting as soon as the meeting participants are present (ASAP), in which no lifelines are required for the meeting. For example, the function 1200 includes steps 1202–1206 for suspending the start of the meeting when a sufficient number of the participants are not present, and steps 1208–1214 for starting the meeting when the participants are present and have invoked their respective notifications of the meeting.

Figure 14:
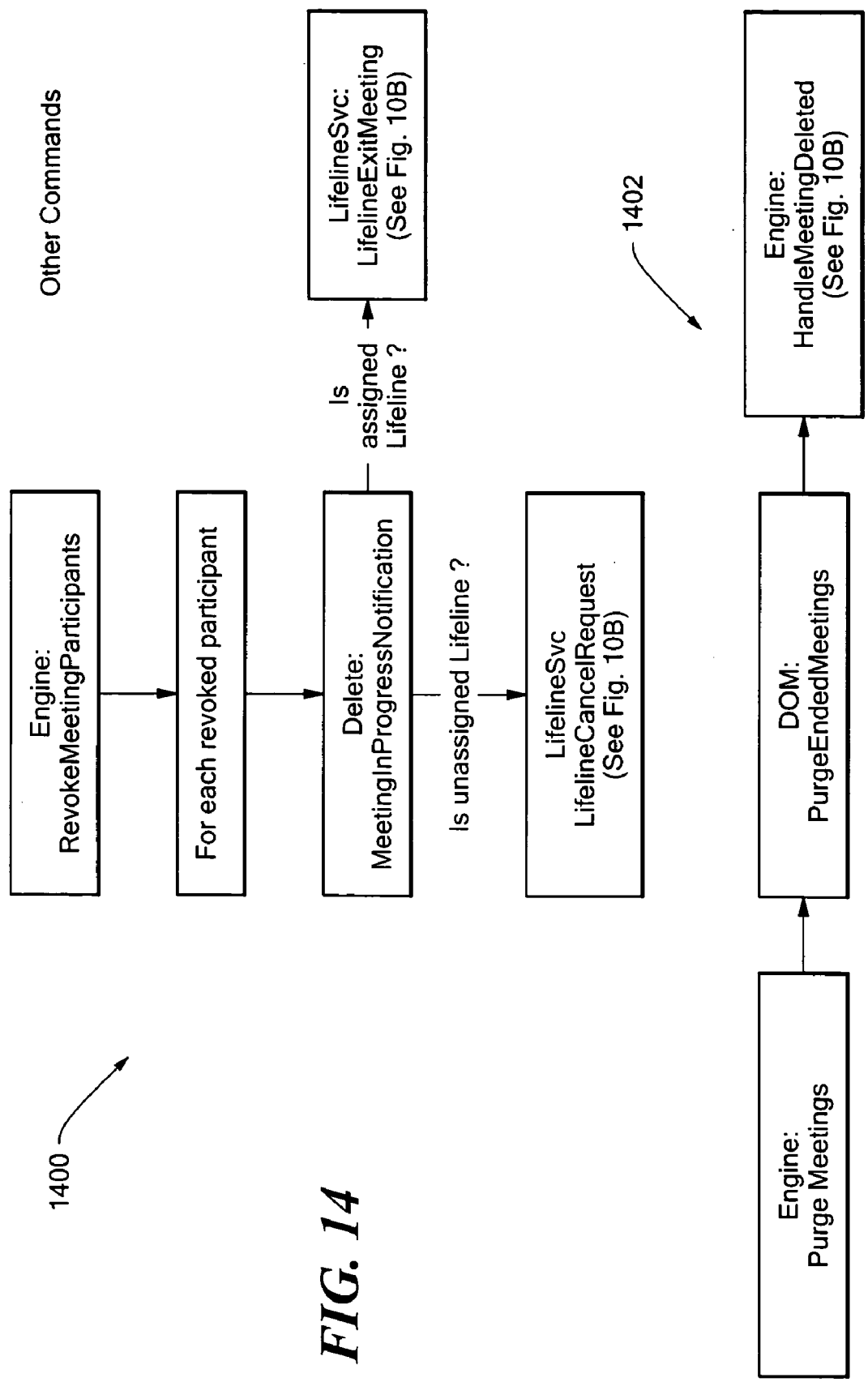
FIG. 14 is a flow diagram of additional commands that may be employed in the functions of FIGS. 10–13.
Figure 15:
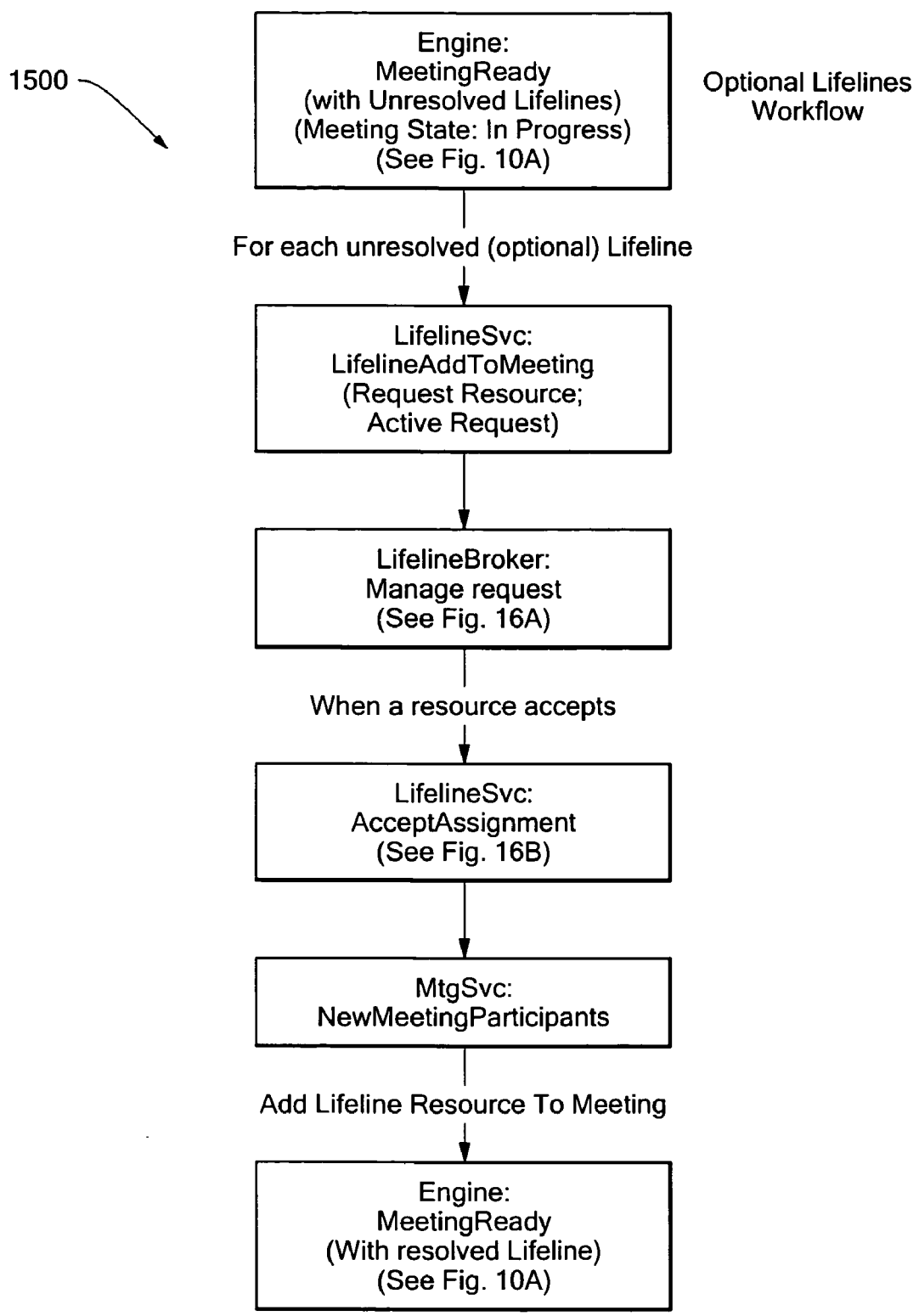
FIG. 15 is a flow diagram of an illustrative lifeline workflow that may be employed in the functions of FIGS. 10–13.

FIG. 14 depicts other illustrative function commands 1400 and 1402, i.e., RevokeMeetingParticipants and Purge Meetings, which may be employed for removing participants from meetings and removing completed meetings from the system. Finally, FIG. 15 depicts a lifeline workflow 1500 that is used to add lifelines to meetings when the user has specified that their inclusion is optional.

The presently disclosed embodiment of the rules based real-time communication system will be better understood with reference to the following illustrative examples.

EXAMPLE 1

Meet As Soon As Present (ASAP)

An example of a useful facility that may be provided by the disclosed system is a method of scheduling a meeting when all of the participants are available, referred to here as Meet ASAP. For example, in the case where a sender, A, wants to convene a meeting of three people, himself, B, and C. A selects B and C from his list of contacts and presses a Meet button within the graphical user interface. The system checks the presence of B and C and determines that B is online but C is not, and that a stand-in for C is available. It then gives A three choices:
1. Hold the meeting with just B.
2. Hold the meeting with B and with C's designated stand-in.
3. Wait until B and C are both present.

In the case where A chooses option 3, the system monitors the presence of A, B, and C and starts the meeting when all three are present. To support this choice, the disclosed system provides the following features in a highly scalable manner, and potentially over arbitrarily long periods of time:
1. Monitoring the presence of users on multiple instant messaging systems
2. Supporting rules for determining such things as when to hold meetings.

The disclosed system monitors user presence through multiple instant messaging systems in two ways:
1. For instant messaging systems that provide open interfaces for exchanging presence (such as IBM Lotus Instant Messaging), the disclosed system retrieves presence through that interface. See FIG. 8.
2. For instant messaging systems that do not provide an open interface, the disclosed system intercepts presence information through the mechanism as follows (see FIG. 7):

Step 1. When client software for the disclosed system is installed on a sender's computer, it sets up a process, referred to for purposes of explanation as proc_1, that runs automatically when Microsoft Windows is started. Proc_1 registers with Windows to receive an event whenever a top-level window is created. If such a window belongs to an instant messaging system of interest, proc_1 then registers to be notified when any of those windows create new windows and it installs hooks to intercept input and output on network sockets. That socket i/o is directed to a second process, referred to for purposes of explanation as proc_2, which parses the data stream for messages describing the presence state of users being observed by the sender. That presence state is sent to the disclosed real-time messaging server which tracks it for use in step 2.

Step 2. When a sender requests a meeting, the client software for the disclosed system executes a set of rules to decide what to do. Such rules may be hard-coded in an appropriate programming language, such as C#, or alternatively users may be permitted to define their own rules. The rules behave as described above, looking through contact information, presence, and stand-ins to bring users together for a real-time action such as a meeting. The sender can control the operation of the system by modifying information stored by the system, e.g. selecting a new delegate or changing the contact information.

Step 3. Since a request can take days or weeks to process, the disclosed real-time messaging server stores information in a dictionary that resides in the relational database. When an event notification is received, such as a change in a user's presence or a pre-defined time for the expiration of a request, the disclosed real-time messaging server determines if there are any requests that depend on that event and retrieves the relevant information to process the event from the dictionary.

While various specific embodiments may be used, in one exemplary embodiment, two server-side processes may be used. One is the rules engine, which executes rules consisting of scripts. These rules/scripts are nearly stateless, but can use one or more associated dictionary data structures within the database containing the persistent state that a given script uses. Scripts may be stored in the database when they are inactive, along with their dictionary and metainformation about the script. A second server-side process that may be provided is a visibility server. The visibility server itself includes two elements: a raw presence server that keeps track of each user's actual online state, and a subscription service that keeps track of users that are paying attention to other users. The subscription service operates on the raw presence data and processes it to determine which users can see the presence information of which other users according to the rules processed by the rules engine. Accordingly, when a meeting request is received by the rules engine, and the meeting cannot be immediately held because of the unavailability of one or more participants, the rules engine creates a script to enable the convening of that meeting, and indicates to the visibility server that it is looking for all of the required participants for the meeting. The rules engine then goes to "sleep" with regard to that request. Whenever one of the attendees changes presence state, the visibility server sends a message to the engine, which checks whether all the required attendees are now present. If so, it executes the script, which sends a message to the user saying that the meeting may now be convened. If not, it just ignores the state change. Thus, the request from the rules engine to the visibility server consists of a script setting a bit of metadata, indicating to "wake me up when the following people are all present". This metadata persists along with the sleeping script in the database. As a result, if anything should happen to the visibility server (which resides mainly in memory), the desired subscriptions can be recreated from the metadata of the sleeping scripts in the database.

As described above, the visibility server sends a message to the rules engine whenever an attendee changes state. In an alternative embodiment, the visibility server has the presence rules encoded within it, and only sends messages to the rules engine when the entire subscription becomes ready (where it is "ready" when all required attendees are available in the view of the convening user). Although this typically adds some complexity to the visibility server, network traffic is reduced.

EXAMPLE 2

Routing & Approval

The disclosed availability and rules-based mechanism that allows the effective delivery of real-time actions among users, such as the convening of meetings, can also be used for other real-time actions. For example, the disclosed aggregated presence information and availability filtering, together with real-time communication, can be used to route documents for revision and approval in a timely and efficient manner. As with a meeting request, a document routing form, for example filled out through a GUI on a client system, and provided to the rules engine as an event notification, can contain a list of users that are needed to review an electronic document. In the disclosed system, the routing of the document among the users in the review list may be determined in response to the presence-based availability of specific users in the list. For example, the disclosed system may operate by temporarily skipping users in the review list that are not currently available to process the document, and instead routing the document to one or more users in the review list that are determined to be currently available for the review. Additionally, if a user has been routed the document to be reviewed, and fails to route it within a predetermined time limit, the disclosed system may operate to forward to the document to another user for review that is determined to be currently available.

The disclosed system may be embodied to provide a user interface, for example through a GUI, through which a person that has reviewed a document, may expressly forward the document to a next person on the review list. The disclosed system may indicate a next person on the review list to forward the document to based on a determination that a user on the list that was previously skipped is now available. Alternatively, the disclosed system may provide an interface allowing the current reviewer to specify that the document is to be routed back to one of the previous reviewers, or even directly back to the original author. In addition, the disclosed system may be embodied such that, if a user on the review list is not currently available, the document may be routed to his or her specified stand-in user.

EXAMPLE 3

Sequential Scheduling

The disclosed system may further be embodied to effectively support sequential meeting scheduling. In general, meeting scheduling systems attempt to display people's free time, allow the meeting requester to propose a time, and then send out invitations which can be either accepted or refused. Using the disclosed system, meeting invitations, such as email or other electronic data messages, may be sent out to one user at a time, in a similar manner to that described above for document routing. Accordingly, the meeting invitation is sent to users based on their current presence-based and user configured availability. The meeting invitee user list may also optionally be processed by transmitting an invitation to users on the list based on an ordering in which those users considered or designated as the most senior, and/or that are considered or designated as the most difficult to schedule, are contacted first, with each user specifying a range of available times, and wherein a list of possible meeting times contained in the invitation becomes narrower as the invitation routing proceeds. Alternatively, the meeting invitation can be simultaneously broadcast to all users on the list with the list of times becoming narrower as users respond, potentially giving people an incentive to respond quickly.

EXAMPLE 4

External Events

In addition to processing requests for real-time actions such as meetings, and/or event notifications reflecting presence status or changes, the disclosed system may be embodied to process notifications of other types of events from various external systems. For example, such an external event processed by the disclosed system may reflect a specified change in a database, such as a customer exceeding a credit limit, or an alert generated by any external program, such as a customer relationship management system indicating that a customer entered a complaint. Availability filtering by the disclosed system may reflect the receipt of such notifications of external events.

Having described the above illustrative embodiments, other alternative embodiments or variations may be made. For example, it was described that a user of the disclosed system may request a meeting via a software program installed on a client computer. In an alternative embodiment, a user may invoke at least a subset of the features of the disclosed system via a standard web browser. In this alternative embodiment, the user may employ a portal accessible through a web page to communicate with a predefined lifeline. For example, the lifeline portal may be implemented as a form within the web browser interface. In this way, users may be afforded the benefits of lifelines without having to install specialized software programs on their computers. It is understood that other suitable features of the disclosed system may be made available to users via the Internet or world wide web. In addition, at least part of the functionality of the disclosed system may be made available to users via a telephone instead of a computer. For example, by using Dual Tone Multi-Frequency (DTMF—"touch tone") signals, voice recognition technology, menus (in the case of "smart" telephones), or any other suitable telephone technology, a user of the disclosed system may ascertain the presence of other system users and may convoke a meeting, such as a teleconference or a video conference. The resulting meeting may also be a meeting that took place at a different time or place via the computer.

In addition, it was described that the disclosed system may be employed to set up meetings by monitoring the online presence of each intended participant of the meeting, and by starting the meeting when a suitable subset of the meeting participants become available. In an alternative embodiment, the disclosed system may be operative to check the calendars of the intended participants as part of the process of setting up a meeting. As a result, meetings would be scheduled only at those times indicated as being free on the respective participants' calendars. For example, the participants' calendars may be implemented using Microsoft Outlook or any other suitable software application.

While the disclosed system is described herein with reference to various embodiments and examples of operation in which convening a meeting is used as an example of a real-time activity or action, the real-time activities or actions provided by or in connection with the disclosed system are not limited to meetings between users, and may additionally or alternatively include chat sessions, shared whiteboards, remote presentations, audio conferences, video conferences, and/or any combination of these or other forms of communication between users. For example, any specific type of internal or external collaboration and conferencing software, having some combination of functionalities such as those provided in Microsoft® Office Live Meeting™, which includes point-to-point telephony and videophone capability over the Internet as well as multipoint whiteboard and application sharing, may be used to partially or completely provide the real-time activities and/or actions described herein.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Therefore, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method of performing real-time communications over a computer data network between at least two users, each of said at least two users being associated with a client system communicably coupled to said computer data network, comprising the steps of:

receiving, at a server system communicably coupled to said computer data network, a request for a real-time group action involving a group of users, each user having at least one condition associated therewith, a status of the condition associated with each user being indicative of an availability of the user for participating in the real-time group action, wherein the availability of each user is based at least in part upon a digital indication of an online presence of the respective user;

in a first determining step, in response to the request, determining the status of the condition associated with each user within the group;

in a second determining step, determining whether the real-time group action can be performed based at least in part on the status of the condition associated with each user within the group;

in a third determining step, in the event the real-time group action cannot be performed based on the status of the condition associated with at least one user within the group, the condition status indicating that the at least one user is unavailable to participate in the real-time group action, determining at least one user to substitute for the at least one unavailable user within the group;

in a fourth determining step, determining the status of the condition associated with each user within the group including the at least one substitute user;

in a fifth determining step, determining whether the real-time group action can be performed based at least in part on the status of the condition associated with each user within the group and the at least one substitute user; and in a first performing step, in the event the real-time group action can be performed based at least in part on the status of the condition associated with each user within the group and the at least one substitute user, performing the real-time group action.

2. The method of claim 1 wherein each of the first, second, third, fourth, and fifth determining steps and the first performing step are responsive to processing of at least one rule.

3. The method of claim 1 wherein the request is a request to convene an automated meeting activity.

4. The method of claim 3 wherein the automated meeting activity is selected from the group consisting of an online meeting, a teleconference, a shared whiteboard, a remote presentation, and a video conference.

5. The method of claim 1 wherein the step of determining the status of the condition associated with each user in the first determining step is responsive to at least one event notification indicating that at least one user is using at least one software program installed on a client system.

6. The method of claim 5 wherein the at least one event notification indicates that the at least one user is using instant messaging client software installed on the client system.

7. The method of claim 1 wherein the step of determining at least one user to substitute for the at least one unavailable user within the group in the third determining step includes selecting a user to substitute for the unavailable user.

8. The method of claim 7 wherein the step of determining at least one user to substitute for the at least one unavailable user within the group in the third determining step includes determining whether the selected substitute user agrees to participate in the real-time group action before performing the real-time group action in the first performing step.

9. The method of claim 1 further including a step of inviting each user to participate in the real-time group action whether or not at least one of the users is determined to be unavailable for the real-time group action.

10. The method of claim 1 further including a step of inviting each user to participate in the real-time group action that is determined to be available for the real-time group action.

11. The method of claim 1 wherein the receiving step includes receiving a plurality of requests for a plurality of real-time group actions, and further including, in a sixth determining step, determining which one or ones of the real-time group actions are currently in-progress.

12. The method of claim 1 wherein the receiving step includes receiving a plurality of requests for a plurality of real-time group actions, and further including, in a sixth determining step, determining which one or ones of the real-time group actions are pending based on the availability of the users.

13. The method of claim 1, wherein said receiving step includes receiving a plurality of requests for a plurality of real-time group actions, and further including, in a sixth determining the step, determining which one or ones of the real-time group actions are ready to be performed based on the availability of the users.

14. The method of claim 1 further including a step of defining the group of users to participate in the real-time group action.

15. The method of claim 14 wherein the defining step includes determining a time for the real-time group action to be performed in the first performing step.

16. The method of claim 15 wherein the defining step includes determining the time for the real-time group action to be performed in the first performing step by checking respective calendars of the users within the group.

17. The method of claim 14 further including, in a sixth determining step, determining whether or not each respective user within the group accepts being included in the group before performing the real-time group action in the first performing step.

18. The method of claim 17 further including a step of adding the respective user to the group if the user accepts being included in the group.

19. The method of claim 1 further including a step of requesting the real-time group action via a client computer having software installed thereon operative to facilitate the performance of real-time communications between at least two users in the first performing step.

20. The method of claim 1 further including a step of requesting the real-time group action via a web page.

21. The method of claim 1 further including a step of requesting the real-time group action via a telephone.

22. A system for performing real-time communications between at least two users, comprising:
a computer data network;
a plurality of client systems communicably coupled to said computer data network, each of said plurality of client systems being associated with a respective one of said at least two users; and at least one server system communicably coupled to said computer data network, said at least one server system including at least one processor, and at least one computer program storage memory communicably coupled to the processor, the computer storage memory including at least one computer program executable by the processor, the computer program including first program code for receiving a request for a real-time group action involving a group of users, each user having at least one condition associated therewith, a status of the condition associated with each user being indicative of an availability of the user for participating in the real-time group action, wherein the availability of each user is based at least in part upon a digital indication of an online presence of the respective user, second program code for determining the status of the condition associated with each user within the group in response to the request, third program code for determining whether the real-time group action can be performed based at least in part on the status of the condition associated with each user within the group, fourth program code for determining at least one user to substitute for the at least one unavailable user within the group in the event the real-time group action cannot be performed based on the status of the condition associated with at least one user within the group, the condition status indicating that the at least one user is unavailable to participate in the real-time group action, fifth program code for determining the status of the condition associated with each user within the group including the at least one substitute user, sixth program code for determining whether the real-time group action can be performed based at least in part on the status of the condition associated with each user within the group and the at least one substitute user, and seventh program code for performing the real-time group action in the event the real-time group action can be performed based at least in part on the status of the condition associated with each user within the group and the at least one substitute user.

23. The system of claim 22 wherein the second program code for determining the status of the condition associated with each user within the group, the third program code for determining whether the real-time group action can be performed based at least in part on the status of the condition associated with each user within the group, the fourth program code for determining at least one user to substitute for the at east one unavailable user within the group the fifth program code for determining the status of the condition associated with each user within the group including the at least one substitute user, the sixth program code for determining whether the real-time group action can be performed based at least in part on the status of the condition associated with each user within the group and the at least one substitute user, and the seventh program code for performing the real-time group action, are responsive to the processing of at least one rule.

* * * * *

UNITED STATES PATENT AND TRADEMARK OFFICE
CERTIFICATE OF CORRECTION

| | | |
|---|---|---|
| PATENT NO. | : 7,149,288 B2 | Page 1 of 1 |
| APPLICATION NO. | : 10/731872 | |
| DATED | : December 12, 2006 | |
| INVENTOR(S) | : Charles J. Digate et al. | |

It is certified that error appears in the above-identified patent and that said Letters Patent is hereby corrected as shown below:

Column 2 line 5, "(AIMT$^{TM}$)" should read --(AIM$^{TM}$)--;

Column 21, claim 13, line 31, "the step," should read --step,--; and

Column 22, claim 23, line 55, "at east one" should read --at least one--.

Signed and Sealed this

Seventh Day of August, 2007

JON W. DUDAS
*Director of the United States Patent and Trademark Office*